United States Patent
Zhao et al.

(10) Patent No.: US 9,544,601 B2
(45) Date of Patent: Jan. 10, 2017

(54) WEDGELET PATTERN EXTENSION FOR DEPTH INTRA CODING

(71) Applicant: QUALCOMM Incorporated, San Diego, CA (US)

(72) Inventors: Xin Zhao, San Diego, CA (US); Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 14/513,839

(22) Filed: Oct. 14, 2014

(65) Prior Publication Data

US 2015/0103906 A1    Apr. 16, 2015

Related U.S. Application Data

(60) Provisional application No. 61/891,203, filed on Oct. 15, 2013.

(51) Int. Cl.
| H04N 19/11 | (2014.01) |
| H04N 19/46 | (2014.01) |
| H04N 19/593 | (2014.01) |
| H04N 19/597 | (2014.01) |
| H04N 19/17 | (2014.01) |

(52) U.S. Cl.
CPC .............. *H04N 19/11* (2014.11); *H04N 19/17* (2014.11); *H04N 19/46* (2014.11); *H04N 19/593* (2014.11); *H04N 19/597* (2014.11)

(58) Field of Classification Search
CPC ...... H04N 19/46; H04N 19/593; H04N 19/17; H04N 19/597; H04N 19/11
USPC ..................................................... 375/240.12
See application file for complete search history.

(56) References Cited

U.S. PATENT DOCUMENTS

2014/0247871 A1* 9/2014 Merkle ............ H04N 19/00533
   375/240.12
2014/0307787 A1* 10/2014 Zheng .................. H04N 19/597
   375/240.12

FOREIGN PATENT DOCUMENTS

DE    WO 2013068566 A1 * 5/2013    ....... H04N 19/00533
WO       2013068566 A1    5/2013

OTHER PUBLICATIONS

Kawamura et al. "3D-CE6.h related: Calculation Sample Reduction for Depth Modeling Mode 1 and 3". JCT3V-O0230. Jan. 2013, pp. 1-3.*

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16), 137 pp.

(Continued)

*Primary Examiner* — Christopher S Kelley
*Assistant Examiner* — Zhihan Zhou
(74) *Attorney, Agent, or Firm* — Shumaker & Sieffert, P.A.

(57) ABSTRACT

Techniques are described determining a partition pattern for intra-prediction encoding or decoding a depth block from a partition pattern of one or more partition patterns associated with smaller sized blocks. A video encoder may intra-prediction encode the depth block based on the determined partition pattern, and a video decoder may intra-prediction decode the depth block based on the determine partition pattern.

25 Claims, 10 Drawing Sheets

(56) References Cited

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16), 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16), 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16); JCTVC-F803_d2, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Kawamura, et al., "3D-CE6.h related: Calculation Sample Reduction for Depth Modeling Mode 1 and 3", MPEG Meeting; Jan. 17-23, 2013; Document: JCT3V-C0230; Geneva; (Motion Picture Expert Group or ISO/IEC JTC1/SC29/WG11), No. m28288, XP030056834, Jan. 17, 2013, 3 pp.
Merkle, et al., "CE6.H results on simplified Wedgelet search for DMM modes 1 and 3", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-B0039, XP030130220, Oct. 9, 2012, 4 pp.
Song, et al., "3D-CE6.h related: Complexity Reduction of DMM Mode 3", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-B0122, XP030130303, Oct. 9, 2012, 3 pp.
Zhang, et al., "3D-HEVC Test Model 5", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-E1005, Sep. 14, 2013, XP030131385, 50 pp.
Zhao, et al., "3D-CE6.h related: Depth Modeling Mode (DMM) 3 simplification for HTM", JCT-3V Meeting; MPEG Meeting; Jul. 16-20, 2012; Stockholm; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-A0098, XP030130097, Jul. 11, 2012, 5 pp.
Zhao, et al., "CE5 related: Simplification of Wedgelet pattern generation in half-pel accuracy", JCT-3V Meeting; Oct. 25-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-F0133, XP030131559, Oct. 18, 2013, 4 pp.
Zhao, et al., "CE5 related: Wedgelet pattern extension from 4×4 block", JCT-3V Meeting; Oct. 25-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-F0134, XP030131560, Oct. 18, 2013, 5 pp.
Tech, et al., "3D-HEVC Draft Text 1," JCT-3V Meeting; Jul. 27-Aug. 2, 2013; (The Joint Collaborative Team on 3D Video Coding Extension Development of ISO/IEC JTC1/SC29/WG11 and ITU-T SG.16); Document: JCT3V-E1001_v3, Sep. 11, 2013; 89 pp.
Wang, et al., "High Efficiency Video Coding (HEVC) Defect Report", JCT-VC Meeting; Jul. 25-Aug. 2, 2013; Vienna; (Joint Collaborative Team on Video Coding of ISO/IEC JTC1/SC29/WG11 and ITU-TSG.16 ); URL: http://wftp3.itu.int/av-arch/jctvc-site/, No. JCTVC-N1003_v1, Sep. 27, 2013, XP030114947, 311 pp. [uploaded in parts].
International Search Report and Written Opinion and International Application No. PCT/US2014/060732, dated Jan. 15, 2015, 14 pp.
Response to Written Opinion dated Jan. 15, 2015, from International Application No. PCT/US2014/060732, filed on Aug. 14, 2015, 22 pp.
Second Written Opinion from International Application No. PCT/US2014/060732, filed on Oct. 19, 2015, 5 pp.
Response to Second Written Opinion dated Oct. 19, 2015, from International Application No. PCT/US2014/060732, filed on Dec. 18, 2015, 24 pp.
International Preliminary Report on Patentability from International Application No. PCT/US2014/060732, dated Jan. 22, 2016, 10 pp.

* cited by examiner

Orientation: 2

Orientation: 5

Orientation: 1

Orientation: 4

Orientation: 0

Orientation: 3

WEDGELET PATTERN EXTENSION FOR DEPTH INTRA CODING

This application claims the benefit of U.S. Provisional Application No. 61/891,203, filed Oct. 15, 2013, the entire content of which is incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

The techniques of this disclosure generally relate to deriving a partition pattern for an intra-predicted block of video data based on a partition pattern associated with smaller sized blocks. In some examples, the intra-predicted block may be a block of a depth map, and the partition pattern may be a line-based partition pattern that partitions the sub-block into two partitions divided by a linear line that bisects the sub-block.

In one example, the disclosure describes a method of decoding video data, the method comprising determining a partition pattern associated with a block of a first size, determining a partition pattern for a depth block of a second size based on the determined partition pattern associated with the block of the first size, wherein the second size is larger than the first size, and intra-prediction decoding the depth block based on the determined partition pattern for the depth block.

In one example, the disclosure describes a method of encoding video data, the method comprising determining a partition pattern associated with a block of a first size, determining a partition pattern for a depth block of a second size based on the determined partition pattern associated with the block of the first size, wherein the second size is larger than the first size, and intra-prediction encoding the depth block based on the determined partition pattern for the depth block.

In one example, the disclosure describes a device for video coding, the device comprising a video data memory that stores one or more partition patterns associated with a block of a first size, and a video coder comprising one or more processors. The video coder may be configured to determine a partition pattern associated with the block of the first size from the stored one or more partition patterns, determine a partition pattern for a depth block of a second size based on the determined partition pattern associated the block of the first size, wherein the second size is larger than the first size, and intra-prediction code the depth block based on the determined partition pattern for the depth block.

In one example, the disclosure describes a computer-readable storage medium having instructions stored thereon that when executed by one or more processors of a device for video coding cause the one or more processors to determine a partition pattern associated with a block of a first size, determine a partition pattern for a depth block of a second size based on the determined partition pattern associated with the block of the first size, wherein the second size is larger than the first size, and intra-prediction code the depth block based on the determined partition pattern for the depth block.

The details of one or more examples of the disclosure are set forth in the accompanying drawings and the description below. Other features, objects, and advantages will be apparent from the description and drawings, and from the claims.

DETAILED DESCRIPTION

Figure 1:
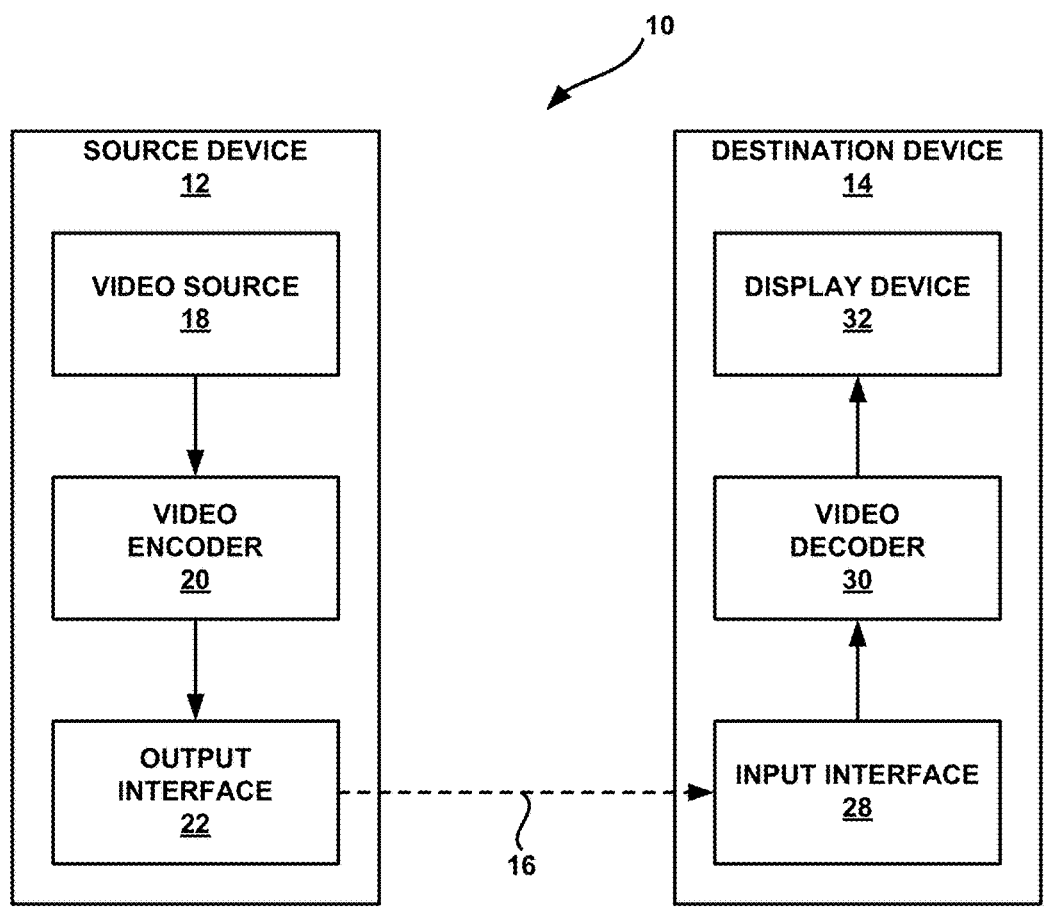
FIG. 1 is a block diagram illustrating an example video encoding and decoding system 10 that may utilize the techniques of this disclosure for depth coding.

In three-dimensional (3D) video coding, such as in accordance with the 3D-HEVC (high efficiency video coding) standard, 3D video data is represented using the multiview video plus depth format, in which captured video data (also referred to as texture components of a texture view) are associated with corresponding depth maps of a depth view. For instance, a texture component, of the texture view, represents the actual video content, and a depth component, corresponding to the texture component, provides a depth map that represents the relative depth of the pixels in the texture component. A video encoder is configured to encode the texture components and depth maps and multiplex the texture components and depth maps into a 3D video bitstream. A video decoder receives the 3D video bitstream and decodes the texture components and depth maps to reconstruct the 3D video data.

To leverage the video encoding capabilities of a video encoder and the decoding capabilities of a video decoder, the depth maps are formed as grayscale video where the luma samples represent the depth values. In this way, the depth values can be encoded and decoded using existing capabilities of the video encoder and the video decoder, instead of having to utilize some additional specialized encoding and decoding techniques for encoding and decoding the depth values.

For example, the video encoder may be configured to utilize inter-prediction encoding and/or intra-prediction encoding and the video decoder may be configured to utilize inter-prediction decoding and/or intra-prediction decoding for coding pictures of video. The video encoder and the video decoder may similarly respectively use inter-prediction and intra-prediction encoding and decoding techniques for coding the depth maps.

In some cases, the depth maps include sharp edges and constant areas, where a sharp edge occurs when there is a relatively large difference between the luma values on one side of the edge and the luma values on the other side of the edge. Due to such different statistics of depth map samples (e.g., luma values), there may be different coding schemes that are designed for depth maps based on a two-dimensional (2D) video codec. For instance, for two-dimensional video coding, there may not be depth maps. However, for 3D video coding that includes depth maps, additional video coding techniques may be useful for encoding and decoding depth maps.

For example, the 3D-HEVC standard extends concepts for 2D video coding, as defined in the HEVC standard, to 3D video coding. The 3D-HEVC standard uses the intra-prediction modes that are defined in the HEVC standard for intra-prediction encoding and decoding. Additionally, the 3D-HEVC standard introduced depth modeling modes (DMMs) together with the HEVC intra-prediction modes to encode or decode an intra-prediction unit of a slice of a depth map (i.e., intra-predict a prediction unit (PU) of a depth slice).

In the DMMs, a block of a depth map is partitioned into two regions, where each region is represented by a constant value. The video encoder determines predictive values for each of the regions that the video encoder uses to intra-predict the block of the depth map. The video encoder may also signal the predictive values for each of the regions to the video decoder, or the video decoder may be configured to determine the predictive values without explicit signaling from the video encoder. In either case, the video decoder may utilize the predictive values for intra-predict the block of the depth map.

One of the ways in which to partition a block of a depth map (referred to as depth block) is referred to as Wedgelet partitioning. In Wedgelet partitioning, the video encoder determines a linear line that bisects the depth block thereby creating two regions. In this way, Wedgelet partitioning may be considered as line-based partitioning, and in some examples, form non-rectangular partitions (but it may be possible to form rectangular partitions). The linear line may start from a point on a side of the depth block and end at a point on an opposite side or orthogonal side of the depth block. As an example, in one orientation, the linear line may start from a point on a left side of the depth block and end at a point on a top side of the depth block. In another orientation, the linear line may start from a point on a top side of the depth block and end at a point on a bottom side of the depth block.

A Wedgelet pattern refers to one way in which a block of a depth map can be partitioned into two regions with a bisecting linear line, and the number of Wedgelet patterns that can exist for a block may be a function of the block size. For instance, for a given resolution (e.g., pixel, half-pixel, or quarter-pixel), for smaller sized blocks (e.g., 4×4 blocks), there are fewer points along the sides of the blocks as compared to larger sized block (e.g. 64×64). Therefore, there are fewer start and end points along each side of the smaller sized blocks as compared to larger sized blocks, resulting in fewer Wedgelet patterns.

In examples where one of the DMM modes is utilized, the video encoder may determine a Wedgelet pattern for the depth block, and intra-predict the Wedgelet pattern based on the determined Wedgelet pattern. Because the video decoder may be configured to perform the inverse process to decode the block, the video decoder may determine the same Wedgelet pattern as the one that the video encoder determined. For instance, in some examples, the video encoder and the video decoder may each store a list of Wedgelet patterns. The video encoder may signal in the video bitstream an index into the list of Wedgelet patterns that identifies the determined Wedgelet pattern. The video decoder may then determine the same Wedgelet pattern as the video encoder based on the signaled index in the list of Wedgelet patterns. As another example, the video encoder may determine the Wedgelet pattern for depth block from the video content characteristics of the corresponding texture block. The video decoder may be configured to implement the same techniques as the video encoder to determine the Wedgelet pattern so that the Wedgelet pattern the video decoder determines and the Wedgelet pattern the video encoder determines are the same Wedgelet pattern.

In the above examples for determining the Wedgelet pattern, the video encoder and the video decoder may be configured to store information for all the Wedgelet patterns for all the block sizes. However, for larger block sizes, the amount of memory needed to store the relatively large number of Wedgelet patterns may be undesirably large. For instance, some drafts of the 3D-HEVC standard proposed not having any Wedgelet patterns for 64×64 sized depth blocks. In other words, it was considered that the disadvantages of having large sized memory for storing Wedgelet patterns for 64×64 sized depth blocks outweighed the benefits of using Wedgelet patterns for intra-predicting 64×64 sized depth blocks.

In the techniques described in this disclosure, a video coder (e.g., the video encoder or the video decoder) may determine a partition pattern (e.g., a Wedgelet pattern) from partition patterns of blocks of a first size (e.g., determine a partition pattern associated with blocks of a first size), and determine a partition pattern for a depth block of a second size based on the determined partition pattern associated with blocks of the first size, where the first size is smaller than the second size. The video coder may intra-prediction code (e.g., encode or decode) the depth block of the second size based on the determined partition pattern. In some examples, the video coder may utilize a partition pattern from partition patterns of a sub-block (e.g., a block within) the depth block of the second size. As an example, the depth block of the second size may be an N×N block, and the sub-block may be an M×M block, where M is less than N, and is within the N×N block.

In some examples, the number of partition patterns that the video coder requires to be stored for a particular block size may be reduced if (i.e., based on) a partition pattern for a depth block of the particular block size is determined from a partition pattern associated with smaller sized blocks. For example, the video coder may store the partition patterns associated with the smaller sized block and then subsequently determine a partition pattern for the larger sized block from the stored partition patterns of the smaller sized block.

For instance, assume that previously a video coder stored Y number of partition patterns for a depth block of a first size and X number of partition patterns for a depth block of a second size, where the first size is smaller than the second size. In this example, because the video coder can use the Y partition patterns for determining the partition pattern for a block of a second size, the video coder may need to store less than X number of partition patterns for depth blocks of the second size.

It may be possible that there are some partition patterns associated with a block of the second size that cannot be determined from a partition pattern for a block of the first size. Accordingly, in some examples, the video coder may still store some (e.g., at least one) partition patterns for depth blocks of the second size, but the number of partition patterns that need to be stored may be reduced relative to previous techniques. In some examples, the video coder may not store any partition patterns for a block of the second, larger size, and may instead determine the partition pattern for a block of the second, larger size from the partition pattern for a block of first, smaller size.

FIG. 1 is a block diagram illustrating an example video encoding and decoding system 10 that may utilize the techniques of this disclosure for depth coding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for motion vector prediction in multi-view coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques in accordance with this disclosure may be performed by any digital video encoding and/or decoding device. Although generally the techniques of this disclosure are performed by a video encoding device and a video decoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to computer-readable medium 16) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

One example of a video coding standard includes the ITU-T H.264/MPEG-4 (AVC) standard, which was formulated by the ITU-T Video Coding Experts Group (VCEG) together with the ISO/IEC Moving Picture Experts Group (MPEG) as the product of a collective partnership known as the Joint Video Team (JVT). Another video coding standard includes the H.264 standard, including its Scalable Video Coding (SVC) and Multiview Video Coding (MVC) extensions. The H.264 standard is described in ITU-T Recommendation H.264, Advanced Video Coding for generic audiovisual services, by the ITU-T Study Group. The Joint Video Team (JVT) continues to work on extensions to H.264/MPEG-4 AVC. The latest joint draft of MVC is described in "Advanced video coding for generic audiovisual services," ITU-T Recommendation H.264, March 2010.

In some examples, video encoder 20 and video decoder 30 may operate according to a High Efficiency Video Coding (HEVC) standard and extensions of the HEVC standard, and may conform to the HEVC Test Model (HM). HEVC was developed by Join Collaboration Team on Video Coding (JCT-VC) of ITU-T Video Coding Experts Group (VCEG) and ISO/IEC Motion Picture Experts Group (MPEG). A recent draft of HEVC is available from http://phenix.int-evry.fr/jct/doc_end_user/documents/12_Geneva/wg11/JCTVC-L1003-v14.zip. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture (or "frame") may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded (e.g., intra-prediction encoded), data for the PU may be included in a residual quadtree (RQT), which may include data describing an intra-prediction mode for a TU corresponding to the PU. As another example, when the PU is inter-mode encoded (e.g., inter-prediction encoded), the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., RefPicList0 or RefPicList1) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding (e.g., intra-prediction coding), a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of pictures. As described herein, "picture" and "frame" may be used interchangeably. That is, picture containing video data may be referred to as video frame, or simply "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 30 may be configured to generally perform the reciprocal procedure to decode the video data and reconstruct the pictures that video encoder 20 utilized for encoding purposes. For example, video decoder 30 may receive the syntax elements and the video data from the signaled bitstream and perform reciprocal operations to intra-prediction decode and/or inter-prediction decode the video data to reconstruct the pictures.

The above description provides example ways in which video encoder 20 and video decoder 30 may encode and decode video data based on the HEVC standard. In the techniques described in this disclosure, video encoder 20 and video decoder 30 may be configured for three-dimensional (3D) video encoding and decoding. For instance, video encoder 20 and video decoder 30 may be configured to for 3D video encoding and decoding using developing video coding standards that leverage the HEVC video coding standard. However, the techniques described in this disclosure are not so limited and may be extended to other 3D video encoding and decoding techniques.

In JCT-3V, there are two HEVC extensions that are being developed, referred to as the multiview extension (MV-HEVC) and the 3D video extension (3D-HEVC). The latest reference software 3D-HTM version 8.0 for 3D-HEVC can be downloaded, as of Oct. 13, 2014, from the following link: [3D-HTM version 8.0]: https://hevc.hhi.fraunhofer.de/svn/svn_3DVCSoftware/tags/HTM-8.0/. The latest working draft (document number: E1001 (JCT3V-E1001)) is available from: http://phenix.it-sudparis.eu/jct2/doc_end_user/documents/5_Vienna/wg11/JCT3V-E1001-v3.zip (however, this link may become disabled). The JCT3V-E1001 document is entitled "3D-HEVC Draft Text 1," by Sullivan et al., and is also available, as of Oct. 13, 2014, from http://phenix.it-sudparis.eu/jct2/doc_end_user/current_document.php?id=1361.

In general, video data coded using 3D video coding techniques may be rendered and displayed to produce a three-dimensional effect. For example, two images of different views (e.g., corresponding to two camera perspectives having slightly different horizontal positions) may be displayed substantially simultaneously such that one image is seen by a viewer's left eye, and the other image is seen by the viewer's right eye.

This 3D effect may be achieved using, for example, stereoscopic displays or autostereoscopic displays. Stereoscopic displays may be used in conjunction with eyewear that filters the two images accordingly. For example, passive glasses may filter the images using polarized lenses or differently colored lenses to ensure that the proper eye views the proper image. Active glasses, as another example, may rapidly shutter alternate lenses in coordination with the stereoscopic display, which may alternate between displaying the left eye image and the right eye image. Autostereoscopic displays display the two images in such a way that no glasses are needed. For example, autostereoscopic displays may include mirrors or prisms that are configured to cause each image to be projected into a viewer's appropriate eyes.

In 3D video coding, there exists a plurality of views and each view includes a plurality of pictures referred to as texture pictures and depth pictures, or simply texture component and depth map. Each texture component may correspond to one depth map. The texture component may include the image content and the corresponding depth map indicates relative depth of the pixels in the texture. The texture components of different views that are to be displayed substantially simultaneously include similar image content, but there is horizontal disparity between objects in the textures of the different views. The texture and depth map are described in more detail below.

In 3D-HEVC, an access unit includes the texture pictures and their corresponding depth pictures that are to be displayed substantially simultaneously. The texture pictures and depth pictures in each view have a unique view identifier (view id) or view order index to identify to which view the pictures belong. However, a depth picture and texture picture of the same view may have different layer identifiers (layer ids).

The techniques of this disclosure relate to coding 3D video data by coding texture components and depth maps. In general, the term "texture" is used to describe luminance (brightness or "luma") values of an image and chrominance (color or "chroma") values of the image. In some examples, a texture image (i.e., texture picture) may include one set of luminance data and two sets of chrominance data for blue hues (Cb) and red hues (Cr). In certain chroma formats, such as 4:2:2 or 4:2:0, the chroma data is downsampled relative to the luma data. In other words, the spatial resolution of chrominance pixels may be lower than the spatial resolution of corresponding luminance pixels (e.g., one-half or one-quarter of the luminance resolution).

Depth data generally describes depth values for corresponding texture data. For example, a depth image (e.g., depth picture) may include a set of depth pixels that each describes depth for corresponding texture data of the corresponding texture picture. The depth data may be used to determine horizontal disparity for the corresponding texture data. Thus, a device that receives the texture and depth data may display a first texture picture for one view (e.g., a left eye view) and use the depth data to modify the first texture picture to generate a second texture picture for the other view (e.g., a right eye view) by offsetting pixel values of the first picture by the horizontal disparity values determined based on the depth values. In general, horizontal disparity (or simply "disparity") describes the horizontal spatial offset of a pixel in a first view relative to a corresponding pixel in the right view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change. Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to slight perception of depth, or may be displayed in different locations for the left and right eye (e.g., with horizontal disparity that is opposite that of pixels located in front of the zero disparity plane). Many other techniques may also be used to convey or define depth data for an image.

Two-dimensional video data is generally coded as a sequence of discrete pictures, each of which corresponds to a particular temporal instance. That is, each picture has an associated playback time relative to playback times of other images in the sequence. These pictures may be considered texture pictures or texture images. In depth-based 3D video coding, each texture picture in a sequence may also correspond to a depth picture (also referred to as a depth map). That is, a depth map corresponding to a texture picture describes depth data for the corresponding texture picture. Multiview video data may include data for various different views, where each view may include a respective sequence of texture pictures and corresponding depth pictures.

As noted above, pictures may correspond to a particular temporal instance. Video data may be represented using a sequence of access units, where each access unit includes all data corresponding to a particular temporal instance. Thus, for example, for multiview video data plus depth, texture pictures from each view for a common temporal instance, plus the depth maps for each of the texture pictures, may all be included within a particular access unit. An access unit may include data for a texture component, corresponding to a texture picture, and a depth component, corresponding to a depth map.

In this manner, 3D video data may be represented using a multiview video plus depth format, in which captured or generated views (texture component) are associated with corresponding depth maps. Moreover, in 3D video coding, texture components and depth maps may be coded and multiplexed into a 3D video bitstream. Depth maps may be coded as grayscale images, where "luma" samples (that is, pixels) of the depth maps represent depth values. In general, a block of depth data (a block of samples of a depth map) may be referred to as a depth block. A depth value may refer to a luma value associated with a depth sample.

In any case, intra- and inter-coding methods (e.g., intra-prediction encoding and decoding and inter-prediction encoding and decoding techniques) may be applied for depth map coding. For instance, as described above, although the depth map indicates depth values for the corresponding texture picture, video encoder 20 and video decoder 30 may encode and decode the depth map using video coding techniques because the depth map is formed as a grayscale image, where the luma samples of the depth map indicate the depth value for the corresponding pixels in the corresponding texture picture.

Depth maps commonly include sharp edges and constant areas, and edges in depth maps typically present strong correlations with corresponding texture data of the corresponding texture picture. Due to the different statistics and correlations between texture and corresponding depth, different coding schemes have been and continue to be designed for depth maps based on a 2D video codec. For example, there may be additional video coding schemes that leverage the different statistics and correlations between texture and corresponding depth for video coding the depth maps than those available in the base HEVC standard.

Figure 2:
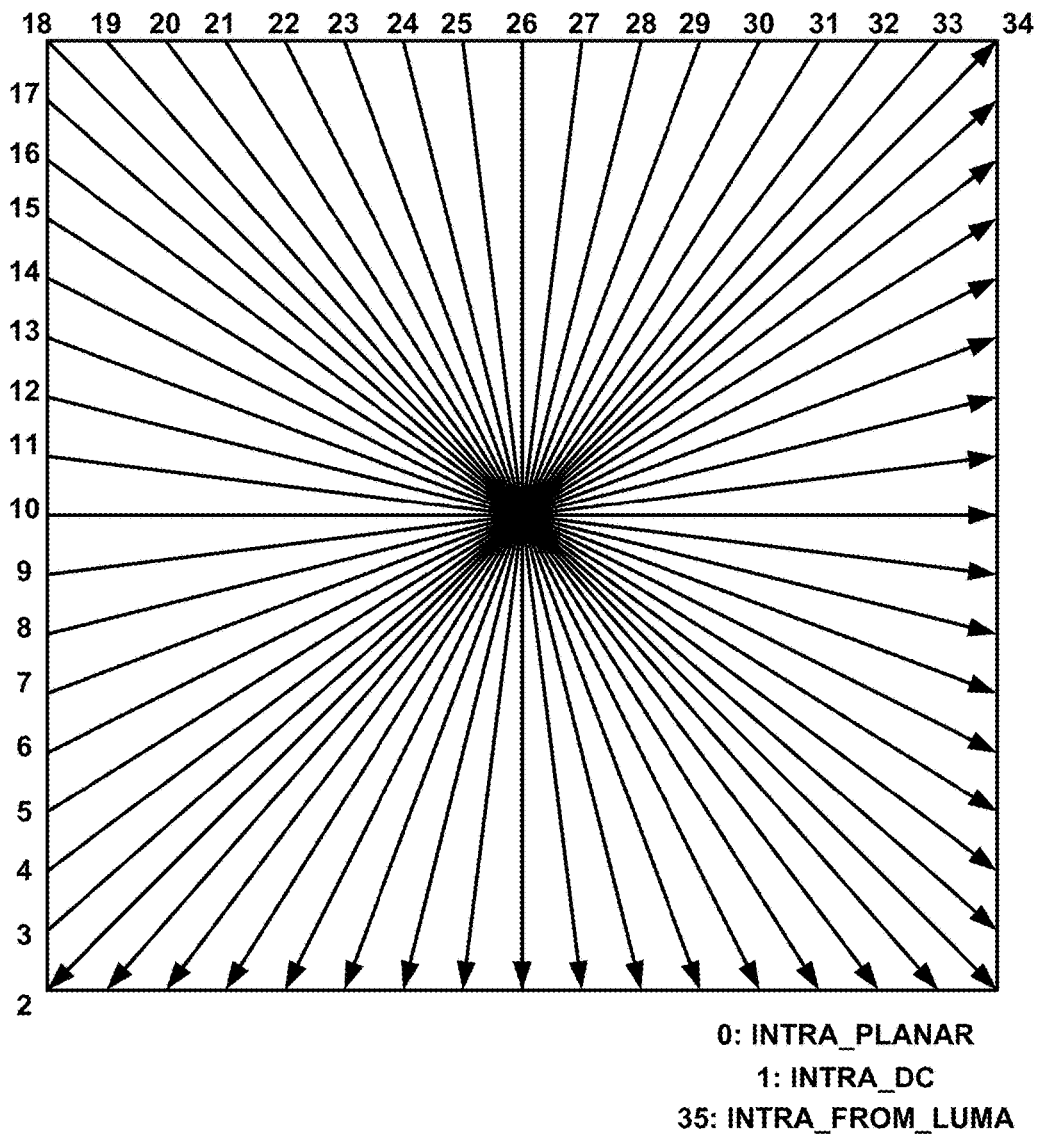
FIG. 2 generally illustrates the prediction directions associated with directional intra-prediction modes.

As one example, in the current HEVC standard, intra-prediction techniques for a luma component of each prediction unit (PU) may utilize 33 angular prediction modes (indexed from 2 to 34), a DC mode (indexed with 1), and Planar mode (indexed with 0). FIG. 2 generally illustrates the prediction directions associated with directional intra-prediction modes. For example, as noted above, the HEVC standard may include thirty five intra-prediction modes, including a planar mode (mode 0), a DC mode (mode 1) and 33 directional prediction modes (modes 2-34). With planar mode, prediction is performed using a so-called "plane" function. With DC mode (e.g., for producing a DC predicted value), prediction may be performed based on an averaging of pixel values within the block. With a directional prediction mode, prediction is performed based on a neighboring block's reconstructed pixels along a particular direction (as indicated by the mode). In general, the tail end of the arrows shown in FIG. 2 represents a relative one of neighboring pixels from which a value is retrieved, while the head of the arrows represents the direction in which the retrieved value is propagated to form a predictive block.

The 3D-HEVC standard uses the same definition of the intra-prediction modes as those of the HEVC standard. In addition, 3D-HEVC introduced Depth Modeling Modes (DMMs) together with the HEVC intra-prediction modes to intra-prediction encode or decode a depth block (e.g., prediction unit) of a depth slice of a depth map. The DMM may be better suited for representations of sharp edges in the depth maps for inter-prediction coding (encoding or decoding) of depth maps.

Some early versions of 3D-HEVC working drafts provide four DMM modes: Mode 1 (explicit Wedgelet signaling), Mode 2 (intra-predicted Wedgelet partitioning), Mode 3 (inter-component Wedgelet partitioning), and Mode 4 (inter-component Contour partitioning). In all four modes, a video coder, such as video encoder 20 or video decoder 30, may partition a depth block into two regions specified by a DMM pattern, where each region is represented by a constant value. The DMM pattern can be either explicitly signaled (mode 1), predicted by spatially neighboring blocks (mode 2), or predicted using a co-located texture block (mode 3 and mode 4).

Some versions of 3D-HEVC working drafts removed DMM mode 2, leaving DMM modes 1, 3, and 4. Some versions of 3D-HEVC working drafts also removed DMM mode 3, leaving DMM modes 1 and 4.

In other words, there are new intra-prediction modes in DMM. In these modes, video encoder 20 and video decoder 30 may be configured to partition a depth block into two regions specified by a DMM pattern (referred to as a partition pattern), where each region is represented by a constant value. For example, video encoder 20 may be configured to use different partition patterns (examples of the partition patterns are described above) to intra-predict encode a depth block, and determine which partition pattern provided the most optimal coding (e.g., in terms of compression and video quality). Video encoder 20 may then intra-prediction encode the depth block using the determined partition pattern. Because video decoder 30 performs the reciprocal process as video encoder 20 to intra-prediction decode the depth block, video decoder 30 may be configured to determine the same partition pattern that video encoder 20 determined to intra-prediction decode the depth block.

Video encoder 20 may signal information indicating the depth modeling mode to video decoder 30, and video decoder 30 may determine the partition pattern from the signaled information indicating the depth modeling mode. For example, if video encoder 20 signals information indicating that the depth modeling mode is one (DMM mode 1), then video decoder 30 may be configured to parse the bitstream for information from video encoder 20 identifying the partition pattern for the depth block. In other words, if video encoder 20 determines that DMM mode 1 is to be used, video encoder 20 may explicitly signal information indicating that a DMM mode is used and signal information that video decoder 30 uses to identify the partition pattern for the depth block. In this way, the partition pattern (e.g., DMM pattern) that video encoder 20 and video decoder 30 use for intra-prediction coding the depth block is the same.

For DMM mode 3 and 4, video encoder 20 may signal information indicating that the DMM mode is mode 3 or 4, but may not signal information identifying the partition pattern for the depth block. Rather, video decoder 30 may be configured to determine the partition pattern for the depth block from the co-located texture block in the corresponding texture picture. Video encoder 20 and video decoder 30 may each be configured to implement the same process for determining the partition pattern (e.g., DMM pattern) from the co-located texture block in the corresponding texture picture for DMM mode 3 and configured to implement the same process for determining the partition pattern (e.g., DMM pattern) from the co-located texture block in the corresponding texture picture for DMM mode 4.

Figure 3A:
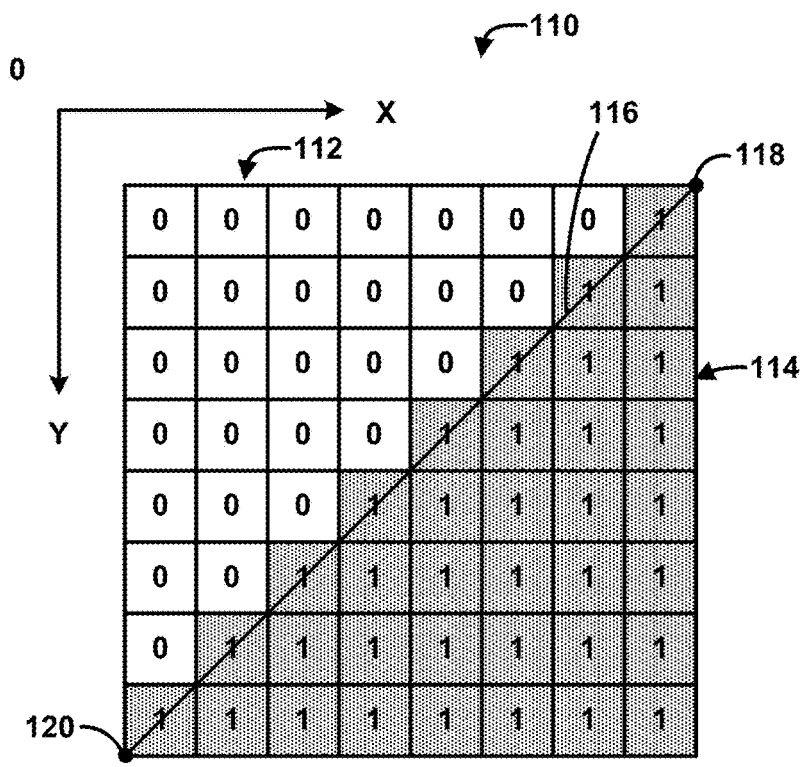
FIGS. 3A and 3B are conceptual diagrams illustrating examples of depth modeling modes (DMMs).
Figure 3B:
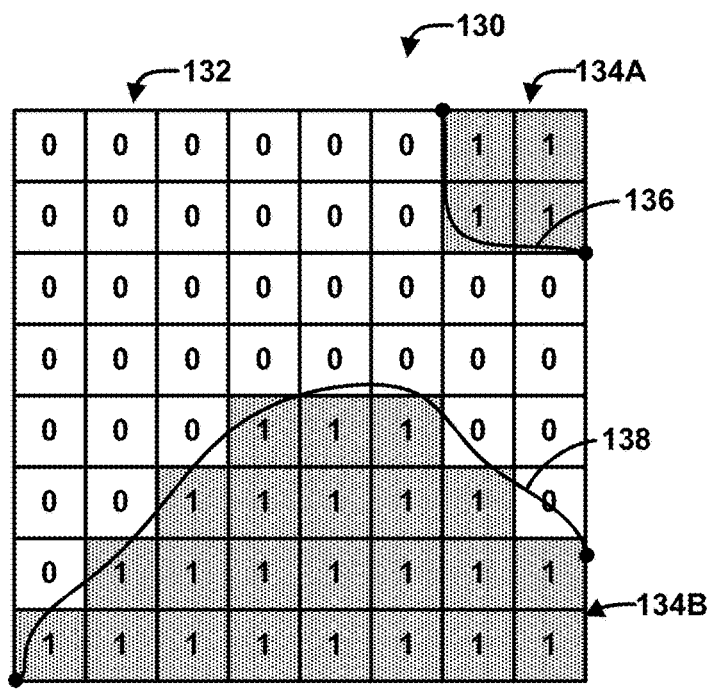

There are two types of partitioning mode defined in DMM, including Wedgelet partitioning and the Contour partitioning. FIGS. 3A and 3B are conceptual diagrams illustrating examples of depth modeling modes (DMMs). FIG. 3A illustrates one example of a Wedgelet pattern for an 8×8 block, and FIG. 3B illustrates on example of a Contour pattern for an 8×8 block.

FIG. 3A, for example, illustrates depth block 110 that is partitioned using Wedgelet partitioning, and FIG. 3B, as another example, illustrates depth block 130 that is partitioned using Contour partitioning. 3D-HEVC includes techniques for depth modeling modes (DMMs) for partitioning blocks along with the intra-prediction modes to code an intra-prediction unit of a depth slice. HTM version 3.1 applies a DMM method for intra coding of depth maps, which may better represent sharper edges in depth maps in some cases.

There are two partitioning models defined in DMM, including Wedgelet partitioning and the Contour partitioning. Again, FIG. 3A illustrates an example of Wedgelet partitioning, and FIG. 3B illustrates an example of Contour partitioning. Each individual square within depth blocks 110 and 130 represents a respective individual pixel of depth blocks 110 and 130, respectively. Numeric values within the squares represent whether the corresponding pixel belongs to region 112 (value "0" in the example of FIG. 3A) or region 114 (value "1" in the example of FIG. 3A). Shading is also used in FIG. 3A to indicate whether a pixel belongs to region 112 (white squares) or region 114 (grey shaded squares).

Each pattern (that is, both Wedgelet and Contour) may be defined by an array of size $u_B \times v_B$ binary digit which label whether the corresponding sample (that is, pixel) belongs to region $P_1$ or $P_2$ (where $P_1$ corresponds to region 112 in FIG. 3A and region 132 in FIG. 3B, and $P_2$ corresponds to region 114 in FIG. 3A and region 134A, 134B in FIG. 3B), where $u_B$ and $v_B$ represent the horizontal and vertical size of the current PU, respectively. In the examples of FIG. 3A and FIG. 3B, the PU corresponds to blocks 110 and 130, respectively. Video coders, such as video encoder 20 and video decoder 30, may initialize Wedgelet patterns at the beginning of coding (e.g., the beginning of encoding or the beginning of decoding).

As shown in the example of FIG. 3A, for a Wedgelet partition, depth block 110 is partitioned into two regions, region 112 and region 114, by straight line 116, with start point 118 located at (Xs, Ys) and end point 120 located at (Xe, Ye). In the example of FIG. 3A, start point 118 may be defined as point (8, 0) and end point 120 may be defined as point (0, 8).

As shown in the example of FIG. 3B, for Contour partitioning, a depth block, such as depth block 130, can be partitioned into two irregularly-shaped regions. In the example of FIG. 3B, depth block 130 is partitioned into region 132 and region 134A, 134B. Although pixels in region 134A are not immediately adjacent to pixels in region 134B, regions 134A and 134B are defined to form one single region, for the purposes of predicting a PU of depth block 130. The Contour partitioning is more flexible than the Wedgelet partitioning, but may be relatively more difficult to signal. In DMM mode 4, in the case of 3D-HEVC, Contour partitioning pattern is implicitly derived using reconstructed luma samples of the co-located texture block.

In this manner, a video coder, such as video encoder 20 and video decoder 30, may use line 116, as defined by start point 118 and end point 120, to determine whether a pixel of depth block 110 belongs to region 112 (which may also be referred to as region "$P_1$") or to region 114 (which may also be referred to as region "$P_2$"). Likewise, a video coder may use lines 136, 138 of FIG. 5B to determine whether a pixel of depth block 130 belongs to region 132 (which may also be referred to as region "$P_1$") or to region 134 (which may also be referred to as region "$P_2$"). Regions "P1" and "P2" are default naming conventions for different regions partitioned according to DMM, and thus, region $P_1$ of depth block 110 should not be considered the same region as region $P_1$ of depth block 130.

As noted above, each of the DMMs may be defined by whether the DMM uses Wedgelet or Contour partitioning, and whether the pattern is explicitly signaled or implicitly determined. The DMM process may be integrated as an alternative to the intra prediction modes specified in HEVC (shown in FIG. 2). A one bit flag may be signaled for each PU to specify whether DMM or conventional intra prediction is applied.

An N×N partition pattern, as shown in FIGS. 3A and 3B, indicates an N×N binary block. In this disclosure, the value at position (i, j) of the N×N binary block is called the partition value of the partition pattern at position (i, j), where i, j=0, 1, . . . , N−1. For each position of an N×N partition pattern, the binary digit value indicates the partition (0 or 1) of the current position.

For instance, FIG. 3A illustrates one example of a Wedgelet pattern in which a linear line (e.g., straight line 116) bisects depth block 110. However, there may be many different Wedgelet patterns. For instance, rather than a linear line starting from (0, 8) and ending at (8, 0), as illustrated in FIG. 3A, in another example, a linear line starting from (1, 8) and ending at (8, 1) is possible. There may be many more such examples of Wedgelet patterns.

In general, the number of Wedgelet patterns may be a function of block size. For instance, larger sized depth blocks include more starting and end points than smaller sized depth blocks, meaning that there are more possible Wedgelet patterns for larger sized depth blocks than for smaller sized depth blocks.

During initialization, a video coder (e.g., video encoder 20 and video decoder 30) may generate all available Wedgelet patterns, which constructs a Wedgelet pattern list. For this purpose, the Wedgelet patterns for all possible combinations of start and end point positions are generated, and a video coder stores in a lookup table the start and end point positions for each block size prior to the coding process. In examples where video encoder 20 identifies which Wedgelet pattern to use for intra-prediction of a depth block, video encoder 20 may signal an index into the lookup table of the Wedgelet patterns, where the index identifies the Wedgelet pattern that video encoder 20 used for intra-prediction encoding the depth block. Video decoder 30 receives the index into the lookup table of the Wedgelet patterns that video decoder 30 constructed during initialization. Video decoder 30 may then determine the Wedgelet pattern identified by the index, and use that Wedgelet pattern for intra-prediction decoding of the depth block. In this manner, video encoder 20 and video decoder 30 may utilize the same Wedgelet pattern for intra-prediction encoding and decoding, respectively.

The possible combinations of start and end point positions can be classified into six categories, depending on the orientation of the partition boundary line connecting start and end point positions. For example, a linear line that bisects the depth block may extend from the top row to left column, bottom row, or right column. A linear line that bisects the depth block may extend from the left column to the bottom row or right column (extending to the top row is already covered in the previous case). A linear line that bisects the depth block may extend from the bottom row to the right column (the others are already covered in the previous case). In the way, there are six categories for the linear line that bisects the depth block. These six categories are listed below in Table 1:

TABLE 1

Orientation of partition boundary line connecting start and end points

| Start point position | End point position | Orientation |
| --- | --- | --- |
| Top row | Left column | 0 |
| Right column | Top row | 1 |
| Bottom row | Right column | 2 |

TABLE 1-continued

Orientation of partition boundary line connecting start and end points

| Start point position | End point position | Orientation |
|---|---|---|
| Left column | Bottom row | 3 |
| Top row | Bottom row | 4 |
| Right column | Left column | 5 |

To generate an N×N Wedgelet partition pattern, given a start point (xS, yS) and an end point (xE, yE) position, video encoder 20 and video decoder 30 may first generate a temporary K×K partition pattern with all samples initialized as 0, where K equals 2N for half-sample (half pixel) accuracy, and K equals N for other cases. Video encoder 20 and video decoder 30 may set the samples which form the partition boundary line connecting (xS, yS) and (xE, yE) as 1, and divide the temporary partition pattern as two parts (e.g., part A and part B as illustrated in FIG. 4).

FIGS. 4A-4F are conceptual diagrams illustrating examples of temporary partition patterns. For instance, FIGS. 4A-4F illustrate two parts divided by the partition boundary line (i.e., the linear line that bisects the depth block) in Wedgelet pattern generation.

After video encoder 20 and video decoder 30 divide the temporary partition pattern as two parts, video encoder 20 and video decoder 30 select one of the two parts to be partition 1. Video encoder 20 and video decoder 30 may be configured to select which of the parts is partition 1 based on the orientation of the Wedgelet pattern boundary line. Because video encoder 20 and video decoder 30 are configured to select which of the parts is partition 1 in the same manner, video encoder 20 and video decoder 30 select the same part to be partition 1. Also, because the other partition (i.e., the partition that is not partition 1) is by default partition 0, video encoder 20 and video decoder 30 select the same part to be partition 0.

Figure 4C:
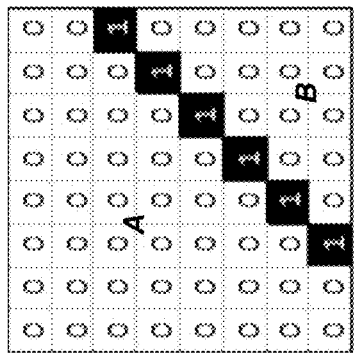
FIGS. 4A-4F are conceptual diagrams illustrating examples of partition patterns.
Figure 4F:
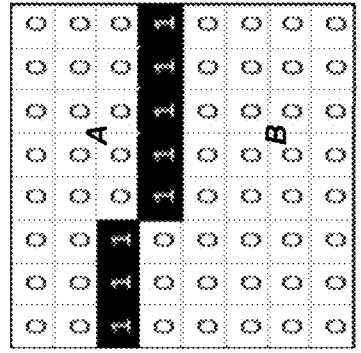
Figure 4B:
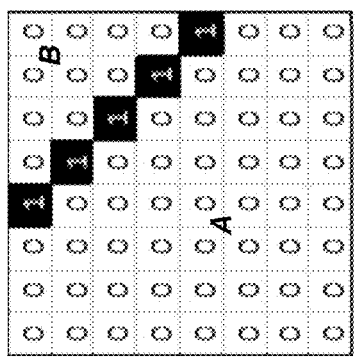
Figure 4E:
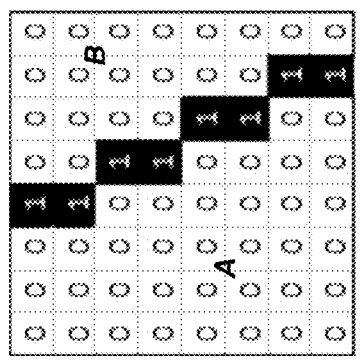

As described above, and indicated by Table 1, there may be six orientations of the linear line that bisects the depth block into two partitions for a Wedgelet pattern. FIGS. 4A-4F illustrate examples of such orientations. It should be understood that FIGS. 4A-4F each illustrate one example of respective orientations, and that there may other examples as well. For instance, FIG. 4B is for orientation 1, and Table 1 above indicates that orientation 1 is right column-to-top row. In FIG. 4B, the linear line starts from (8, 5) and ends at (4, 0). In another example of orientation 1, the linear line may start at (8, 7) and end at (1, 0).

Table 2, below, illustrates the manner in which video encoder 20 and video decoder 30 select which part is to be partition 1 based on the orientation of the partition boundary. For example, video encoder 20 and video decoder 30 may first determine the orientation of the partition boundary (i.e., the orientation of the linear line that bisects the depth block). Then, video encoder 20 and video decoder 30 may determine which partition of the two partitions created by the bisecting linear line should be identified as 1 and which partition should be identified as 0.

Figure 4A:
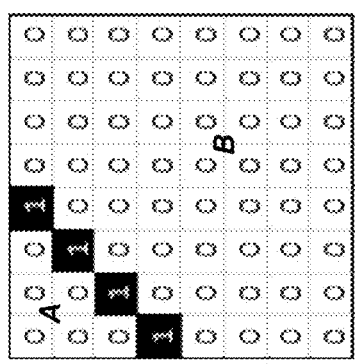
Figure 4D:
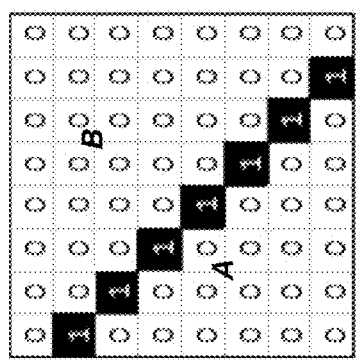

As one example, as indicated in Table 2, if the orientation partition boundary is 0, then video encoder 20 and video decoder 30 select portion A as the partition to be identified with a 1. FIG. 4A illustrates one example where the partition labeled A would be identified as 1, and the partition labeled B would be identified as 0. However, FIG. 4A is one example of orientation partition boundary 1, and there are other examples of orientation partition boundary 1. Video encoder 20 and video decoder 30 may perform similar functions for determining which partition is identified as 1 and which partition is identified as 0 for orientations 1-5 based on the criteria set forth in Table 2.

TABLE 2

Selection of samples for partition 1

| Orientation of partition boundary | Part of samples to be selected as 1 |
|---|---|
| 0 | A |
| 1 | B |
| 2 | B |
| 3 | A |
| 4 | xS + xE < K ? A : B |
| 5 | yS + yE < K ? A : B |

In the example illustrated in FIGS. 4A-4F, the linear line starts from a pixel (e.g., sample) within the depth block and ends at a pixel (e.g., sample) within the depth block. In such examples, the linear line may be considered as having full-sample accuracy. However, the techniques described in this disclosure are not so limited. For instance, the techniques may be extended to half-sample accuracy or even quarter-sample accuracy.

For the case of half-sample accuracy, video encoder 20 and video decoder 30 may generate the N×N partition pattern, referred to as bPattern, as the downsampled version of the temporary K×K (K=2N) partition pattern bTempPattern. In this example, bPattern[i][j]=bTempPattern[m][n], where i, j=0, 1, . . . , N−1, and m, n=0, 1, . . . 2N−1. In this disclosure, the temporary K×K partition pattern is referred to as the corresponding Wedgelet pattern of this N×N partition pattern with start position (xS, yS) and end position (xE, yE), and this corresponding Wedgelet pattern is of size 2N×2N with start position (2*xS, 2*yS) and end position (2*xE, 2*yE). Because of the half-sample accuracy, 2*xS, 2*yS, 2*xE and 2*yE are integer numbers, but xS, yS, xE and yE may be fractional numbers. The mapping between (i, j) and (m, n) depends on the orientation of the partition boundary line. The techniques may be similarly extended for quarter-sample accuracy.

The following describes examples of generating a partition pattern for the case of half-sample accuracy. For purposes of illustration, the examples are described for orientation 0 and orientation 1.

Figure 5A:
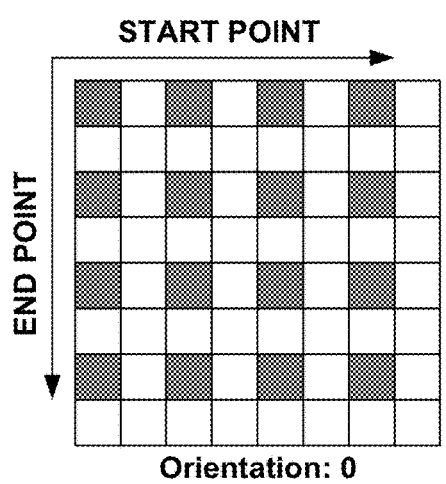
FIGS. 5A and 5B are conceptual diagrams illustrating the mapping of partition pattern samples for half-sample accuracy.
Figure 5B:
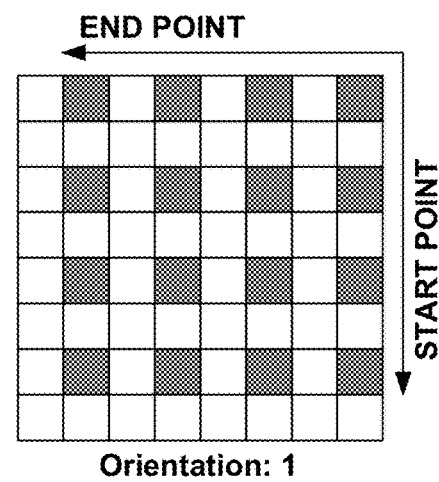

FIGS. 5A and 5B are conceptual diagrams illustrating the mapping of partition pattern samples for half-sample accuracy. For example, FIGS. 5A and 5B illustrate mapping from 2N×2N partition pattern samples to N×N partition pattern samples (e.g., for half-sample accuracy). FIG. 5A illustrates the example of orientation 0, where the start point is on the top row and the end point is on the left column. FIG. 5B illustrates the example of orientation 1, where the start point is on the right column and the end point is on the top row.

In FIGS. 5A and 5B, the shaded blocks indicate the samples of the downsampled N×N partition pattern. For example, the block in FIGS. 5A and 5B may be 2N×2N in size, and, in FIGS. 5A and 5B, the shaded samples indicate every other sample in the 2N×2N block, resulting in N×N blocks.

In some examples, to generate Wedgelet patterns with orientation 0, video encoder 20 and video decoder 30 may loop the start point ((xS, yS)) from (0, 0) to (2N−1, 0), and loop the end point ((xE, yE)) from (0, 0) to (0, 2N−1) to cover all possible start and end points for the Wedgelet patterns with orientation 0. Video encoder 20 and video decoder 30 may also map (i, j) to (m, n), where m=2i and n=2j, for orientation 0. For the case of orientation 1, video encoder 20 and video decoder 30 may loop the start point ((xS, yS)) from (2N−1, 0) to (2N−1, 2N−1), and loop the end point ((xE, yE)) from (2N−1, 0) to (0, 0) to cover all possible start and end points for Wedgelet patterns with orientation 1. Video encoder 20 and video decoder 30 may also map (i, j) to (m, n), where m=2i+1 and n=2j, for orientation 1.

For other orientation cases, video encoder 20 and video decoder 30 may similarly loop the start and end points based on the orientations. The equation for mapping for all orientations may be generalized as m=2i+offsetX and n=2j+offsetY, where offsetX, offsetY are shifting values as specified in Table 3. Video encoder 20 and video decoder 30 may implement the equation m=2i+offsetX and n=2j+offsetY for the mapping for each of the orientations, where offsetX and offsetY are defined by Table 3.

TABLE 3

Setting of offsetX and offsetY based on the orientation of the partition boundary line

| Orientation | offsetX | offsetY |
|---|---|---|
| 0 | 0 | 0 |
| 1 | 1 | 0 |
| 2 | 1 | 1 |
| 3 | 0 | 1 |
| 4 | xS + xE < K ? 0 : 1 | 0 |
| 5 | 0 | yS + yE < K ? 0 : 1 |

As described above, during initialization, video encoder 20 and video decoder 30 may each construct a Wedgelet pattern list that includes start and end points for all Wedgelet patterns (i.e., start and end points for different possible linear lines that bisect the depth block into two partitions for each orientation). In some cases, two Wedgelet patterns may be same. However, video encoder 20 and video decoder 30 may remove duplicate Wedgelet patterns during the Wedgelet pattern list initialization process such that the Wedgelet pattern list includes only unique patterns.

In generating the Wedgelet pattern list, the resolution for the start and end positions used for generating the Wedgelet patterns depends on the block size. For 32×32 blocks, the possible start and end positions are restricted to locations with an accuracy of 2 samples. For 16×16 blocks, full-sample accuracy is used, and for 4×4 and 8×8 blocks, half-sample accuracy is used. Accordingly, the number of possible Wedgelet patterns for different block sizes may be different. In general, the number of possible Wedgelet patterns is directly proportional to the size of the block (i.e., larger block sizes, more Wedgelet patterns, and smaller block sizes, fewer Wedgelet patterns).

During Wedgelet pattern list initialization process, to avoid adding duplicate Wedgelet pattern into the Wedgelet list, video encoder 20 and video decoder 30 may each add newly generated Wedgelet pattern to the end of the Wedgelet list only when the newly generated Wedgelet pattern does not represent the same pattern with any of the current Wedgelet pattern in the list. When comparing two Wedgelet patterns of size N×N (i.e., PatternA[i][j], PatternB[i][j], where i, j=0, 1, . . . , N−1), PatternA is considered to be the same as PatternB if for all possible combinations of i and j in the range of [0, N−1], PatternA[i][j] is always equal to PatternB[i][j] or PatternA[i][j] is never equal to PatternB[i][j].

Due to the different block sizes and different accuracy of start and end point positions, different numbers and different patterns of Wedgelet patterns are available for different block sizes, as listed in below Table 4. For larger block sizes, the total number of Wedgelet patterns may be much larger, which may add to the storage requirement and complexity for pattern generation.

TABLE 4

Number of available Wedgelet patterns in DMM

| block size | Number of available Wedgelet patterns |
|---|---|
| 4 × 4 | 86 |
| 8 × 8 | 782 |
| 16 × 16 | 1394 |
| 32 × 32 | 1503 |
| 64 × 64 | N/A |

A detailed process of Wedgelet list initialization has been specified in H.8.4.4.2.12, H.8.4.4.2.12.1 and H.8.4.4.2.12.2 of the working draft JCT3V-E1001. As noted above, the JCT3V-E1001 document is entitled "3D-HEVC Draft Text 1," by Sullivan et al., and is available, as of Oct. 13, 2014, from http://phenix.it-sudparis.eu/jct2/doc_end_user/current_document.php?id=1361.

There may be certain issues for the block-size dependent Wedgelet pattern design. For instance, for large block sizes, the total number of available Wedgelet patterns may be very large. As illustrated in Table 4, for block sizes of 16×16 the total number of Wedgelet patterns is 1394, and for block sizes of 32×32, the total number of Wedgelet patterns is 1503. The large number of Wedgelet patterns introduces a large memory requirement, which may not be desirable. In other words, video encoder 20 and video decoder 30 may need a large sized memory to store all of the Wedgelet patterns. Also, for constructing the Wedgelet pattern list, video encoder 20 and video decoder 30 may require an undesirable number of memory calls to the memory unit to retrieve the Wedgelet patterns because there are a relatively large number of Wedgelet patterns, especially for larger block sizes.

For this reason (i.e., the large number of patterns), Wedgelet patterns are not supported for 64×64 PUs. For example, in the existing block-size dependent Wedgelet pattern design, the benefits associated with using a Wedgelet pattern for intra-prediction of a depth block may be outweighed by the large number of Wedgelet patterns for 64×64 sized depth blocks. Accordingly, even though there may be benefits associated with Wedgelet pattern based intra-prediction for 64×64 sized blocks, existing techniques may not support such intra-prediction based on Wedgelet pattern for 64×64 sized blocks.

As another example of issues with existing block-size dependent Wedgelet pattern design, in 3D-HEVC, the process of generating a Wedgelet pattern may be complex, especially when the block has a larger size. In addition, 3D-HEVC may require that for each block size, one set of Wedgelet patterns shall be stored. However, for 64×64 sized blocks, intra-prediction using Wedgelet patterns may not be supported, and so no Wedgelet pattern needs to be stored for 64×64 sized blocks for the current Wedgelet pattern design.

As yet another example of issues with existing block-size dependent Wedgelet pattern design, during the Wedgelet pattern list initialization, video encoder 20 and video decoder 30 may be required to perform a significant number of comparison calculations between two Wedgelet patterns to avoid adding duplicate Wedgelet patterns. Such comparison calculations increase the computation complexity, and are not desirable for video encoder 20 or video decoder 30.

The techniques described in this disclosure are related to simplified depth partition pattern generation for depth intra coding. The following examples describe techniques for such a simplified depth partition pattern generation for depth intra coding. The following example techniques may be performed by video encoder 20 and video decoder 30. For example, video encoder 20 and/or video decoder 30 may intra-code depth data (i.e., intra-prediction encode or intra-prediction decode, respectively). Also, the example techniques may be performed separately or one or more techniques may be performed in combination.

Furthermore, for brevity, the techniques described in this disclosure may be described with respect to a video coder. Examples of the video coder include video encoder 20 when describing the encoding of video data, and video decoder 30 when describing the decoding of video data. This disclosure may also use the terms "code" or "coding." In this context, the term code may refer generically to encode or decode and the term coding may refer generically to encoding or decoding. For instance, a video coder may code, which means that video encoder 20 may encode or video decoder 30 may decode.

As described above, one of the issues with existing block-size dependent Wedgelet pattern design is that for larger sized blocks the number of Wedgelet patterns becomes too large, requiring an undesirable amount of memory and increasing computational complexity. In the techniques described in this disclosure, rather than relying on Wedgelet patterns for larger sized depth blocks, the Wedgelet pattern for the larger sized depth block may be determined from a Wedgelet pattern for smaller sized blocks. In this way, video encoder 20 and video decoder 30 may store the Wedgelet patterns (e.g., partition patterns) for smaller sized blocks and store fewer or no Wedgelet patterns for larger sized blocks because video encoder 20 and video decoder 30 may determine the Wedgelet pattern for the larger sized depth block from a Wedgelet pattern of Wedgelet patterns for smaller sized blocks.

As an example, video encoder 20 and video decoder 30 may be configured to construct a partition pattern list (e.g., Wedgelet pattern list) for blocks of a first block size. The partition pattern list may include one or more partition patterns associated with blocks of the first block size. For intra-prediction encoding of a depth block of a second block size, larger than the first block size, video encoder 20 may intra-prediction encode the depth block of the second size using a partition pattern (e.g., a Wedgelet pattern) determined from the partition patterns for blocks of the first block size. In other words, video encoder 20 may intra-prediction encode the depth block of the second size using a partition pattern associated with blocks of the first size. For depth modeling mode (DMM) 1, video encoder 20 may signal an index into the partition pattern list that includes the one or more partition patterns associated blocks of the first block size.

For intra-prediction decoding of the depth block of the second block size, video decoder 30 may receive the index into the partition pattern list that includes one or more partition patters associated with blocks of the first block size, and may determine a partition pattern associated with blocks of the first size from the index. Again, the partition pattern is associated with blocks of a first block size that is smaller than the second block size of the depth block being decoded. Video decoder 30 may then determine a partition pattern for the depth block of the second block size from the determined partition pattern. Video decoder 30 may intra-prediction decode the depth block of the second size based on the determined partition pattern.

As described above, storing partition patterns (e.g., Wedgelet patterns) for larger sized blocks may be undesirable because of the relatively large number of partition patterns that are available for larger sized blocks. By determining the partition pattern for larger sized blocks based on a partition pattern from partition patterns for smaller sized blocks, the number of partition patterns that need to be stored for larger sized blocks may be reduced. For instance, in the previous example, video encoder 20 and video decoder 30 may construct partition pattern list that includes one or more partition patterns associated with blocks of the first block size, and use one of the partition patterns from the partition pattern list to determine the partition pattern for a depth block of a second, larger size. Accordingly, if video encoder 20 and video decoder 30 constructed the partition pattern list for partition patterns of the second size, the number of partition patterns in the partition pattern list would be reduced because some of the partition patterns can be determined from partition patterns for smaller blocks sizes.

In some examples, video encoder 20 and video decoder 30 may not even construct partition list patterns for certain blocks sizes. In such examples, video encoder 20 and video decoder 30 may rely on partition patterns associated with smaller sized blocks to determine the partition patterns for depth blocks of the block sizes for which video encoder 20 and video decoder 30 constructed a partition list pattern.

Also, because there may be fewer or no partition patterns in a partition pattern list for larger block sizes, there may be reduction in the amount of memory needed to store the partition patterns. Moreover, because there may be fewer or no partition patterns in a partition pattern list for larger block sizes, the computational complexity of generating the partition patterns and the complexity of comparing partition patterns to ensure there are no duplicates may also be reduced.

As described above, by determining a partition pattern for a depth block of a larger size based on a partition pattern for a smaller sized block, the techniques described in this disclosure may reduce memory requirements and reduce complexity. In some examples, the smaller sized block may be a block within the larger sized depth block. However, the techniques described in this disclosure are not so limited. In some examples, the smaller sized block need not necessarily be an actual block that is being intra-prediction encoded or decoded. Rather, the smaller sized block may be conceptual block whose partition patterns are used to determine a partition pattern for a larger sized block.

As one example, assume that the depth block being intra-prediction encoded or decoded is a 32×32 sized depth block. In this example, video encoder 20 may signal an index into a partition pattern list for blocks of size 16×16. Video decoder 30 may receive the index into the partition pattern list for blocks of size 16×16 and determine the partition pattern from partition patterns for blocks of size 16×16. In this example, both video encoder 20 and video decoder 30 may be configured to determine the partition pattern for the 32×32 sized depth block from the determined partition pattern for blocks of size 16×16. As one example, video encoder 20 and video decoder 30 may upsample the determined partition pattern for blocks of size 16×16 to determine the partition pattern for the 32×32 sized depth block.

Although the smaller sized block, whose partition pattern list video encoder 20 and video decoder 30 use to determine the partition pattern for the larger sized block, does not need to be part of the larger sized block, the techniques described in this disclosure are described with examples where the smaller sized block is a block within the larger sized block. For example, in one example for depth coding (e.g., intra-prediction coding of a depth block), the partition patterns are independent of block sizes.

It should be understood that in the techniques described in this disclosure video encoder 20 and video decoder 30 may determine a partition pattern for a smaller sized block as an intermediate step for determining a partition pattern for a larger sized block. For example, the smaller sized block may not be intra-prediction encoded or decoded based on the smaller sized block's partition pattern. Rather, the smaller sized block may be intra-prediction encoded or decoded as part of the intra-prediction of the larger sized block.

As an example, assume that the current depth block (e.g., the current depth PU) has a size of N×N. In this example, the current depth block includes an integer number of M×M (where M<N) blocks. As an example, if the current depth block (e.g., the depth block to be intra-prediction encoded or decoded) is a 32×32 sized block, there are four 16×16 sized blocks within the 32×32 sized block, or 64 4×4 sized blocks within the 32×32 sized block.

In some examples, video encoder 20 may signal information identifying one specific M×M block (e.g., where M equals 4) and a line-based partition pattern (e.g., a Wedgelet pattern that defines a linear line that bisects the M×M block into two partitions). Video decoder 30 may receive the information identifying the M×M block and the line-based partition pattern. Based on the line-based partition pattern of the specific M×M block, video encoder 20 and video decoder 30 may determine (e.g., derive) the line-based partition for the whole N×N PU. In other words, based on the partition pattern for an M×M block, video encoder 20 and video decoder 30 may determine a partition pattern for the entire N×N depth block, where the N×N depth block includes the M×M block.

In one example, the line-based partition pattern can be a Wedgelet pattern of DMM1 applied to the specific M×M block as in current 3D-HEVC. For example, video encoder 20 may signal information indicating that the depth modeling mode (DMM) is 1, signal information identifying an M×M block within the N×N block, and signal information used to identify the partition pattern for the M×M block. (e.g., an index value into a partition pattern list for blocks of size M×M). Video decoder 30 may receive information indicating that the DMM is 1, determine the M×M block within the N×N block based on the received information identifying the M×M block, and determine the partition pattern for the M×M block (e.g., based on the index value into the partition pattern list for blocks of size M×M). Video decoder 30 may then determine the partition pattern for whole N×N block based on the determined partition pattern for the M×M block.

As described herein, a "whole" block may include the entire block, including any sub-blocks that may be included in the block. Accordingly, for a block having four sub-blocks, the whole block may refer to the entire block including all of the four sub-blocks.

For example, video encoder 20 may determine a line-based partition pattern for a sub-block (e.g., a Wedgelet pattern that defines a linear line that bisects an M×M block into two partitions) of a block (e.g., N×N block that is a depth PU) for intra depth encoding (intra-prediction encoding), wherein the sub-block is smaller than the block. In some examples, video encoder 20 may determine the line-based partition pattern for the sub-block of the block without basing the determined line-based partition pattern on a size of the block (i.e., independent of the block size). Video encoder 20 may determine a line-based partition pattern for the block based on the line-based partition pattern for the sub-block. Video encoder 20 may intra-encode (intra-prediction encode) the block based on the determined line-based partition pattern for the block. Video encoder 20 may signal information indicating the line-based partition pattern for the sub-block (e.g., encode information indicating the line-based partition pattern for the sub-block). In some examples, video encoder 20 may signal information used to identify the sub-block within the block whose line-based partition pattern video encoder 20 determined; however, this is not required in every example.

Video encoder 20 may not signal information indicating the line-based partition pattern for the block. For example, video encoder 20 may avoid the encoding or not encode information indicating the line-based partition pattern for the block. Rather, video encoder 20 may signal information indicating the line-based partition pattern for the sub-block.

Video decoder 30 may receive information indicating a line-based partition pattern for a sub-block (e.g., decode information indicating a line-based partition pattern for a sub-block) of a block for intra depth decoding (e.g., for intra-prediction decoding). Video decoder 30 may determine a line-based partition pattern for the block based on the line-based partition pattern for the sub-block. Video decoder 30 may intra-decode (intra-prediction decode) the block based on the determined line-based partition pattern for the block. In some examples, video decoder 30 may receive information used to identify the sub-block within the block whose line-based partition pattern was received by video decoder 30; however, this is not required in every example. Video decoder 30 may determine the line-based partition pattern for the block without receiving information indicating the line-based partition pattern for the block. Rather, video decoder 30 may determine the line-based partition pattern from the sub-block. Also, video decoder 30 may determine the line-based partition pattern for the block without basing the determined line-based partition pattern on a size of the block (i.e., independent of the block size).

It should be understood that the M×M sub-block need not necessarily be a block that fits within a larger N×N block. Rather, the M×M sub-block may be a conceptual block whose line-based partition patterns are used for purposes of determining a line-based partition pattern for the N×N block. In other words, in the above example, video encoder 20 may determine a partition pattern (e.g., line-based partition pattern like Wedgelet patterns) for a depth block of a first size (e.g., 32×32) based on a partition pattern for a block of a second, smaller size (e.g., 16×16). Video encoder 20 may intra-prediction encode the depth block based on the determined partition pattern. Video decoder 30 may similarly determine a partition pattern for a depth block of a first size (e.g., 32×32) based on a partition pattern for blocks of a second, smaller size (e.g., 16×16). Again, this smaller sized block does not need to be an actual block in the picture or within the depth block, but is instead a conceptual block whose partition patterns are used to determine a partition pattern for a larger block.

In some examples, video encoder 20 signals information identifying the partition pattern for blocks of the second size, and video decoder 30 determines the partition pattern for blocks of the second size based on the signaled information. For example, video encoder 20 may signal an index to a partition pattern list for partition patterns of the second size, where the partition pattern identified by the index is the partition pattern that video encoder 20 utilized to determine the partition pattern for the depth block of the first size. Video decoder 30 may receive the index into the partition pattern list for partition patterns of the second size, and determine the partition pattern for the depth block of the first size based on the partition pattern for blocks of the second size.

In the above examples, the smaller sized block is a conceptual block and not necessarily a block of the picture that includes the depth block, or a block within the depth block. However, in some examples, the smaller block may be a block within the larger sized block. In examples where the smaller sized block is a block within the larger sized block (e.g., the 16×16 block is one of the four 16×16 blocks within the 32×32 block), video encoder 20 may signal information identifying the location of the smaller sized block in the larger sized block. Video decoder 30 may then determine the partition pattern for the larger sized block based on the partition pattern for the smaller sized block and the position of the smaller sized block within the larger sized block. For instance, video decoder 30 may extend the linear line that bisects the smaller sized block outwards until the linear line encounters edges of the larger sized block. The resulting bisection of the larger sized block may be the partition pattern for the larger sized block determined from the partition pattern of the smaller sized block.

In other words, video decoder 30 may extend a linear line of the partition pattern for the sub-block to boundaries of the depth block. The resulting linear line may be the partition pattern for the depth block used to intra-prediction decode the depth block. Video encoder 20 may similarly extend a linear line of the partition pattern for the sub-block to boundaries of the depth block, and the resulting linear line may be the partition for the depth block used to intra-prediction encode the depth block.

In some examples, video encoder 20 may not need to signal information identifying the position of the smaller sized block. In such examples, video decoder 30 may be pre-configured to use a set smaller sized block as the block from which video decoder 30 extends the partition pattern to determine the partition pattern for the larger sized depth block.

For example, video encoder 20 may signal the index of the specific M×M block (i.e., sub-block), which video decoder 30 receives, with a relative horizontal and vertical index (i, j), with i and j in the range of 0 to N/M−1, inclusive. In this example, the top-left position of M×M block is (M*i, N*j). In this manner, video decoder 30 may determine the position of the M×M block, and further determine the partition pattern for the whole N×N block by extending the linear line, as described in more detail below.

Video encoder 20 and video decoder 30 may encode or decode, respectively, the position (i, j) of the M×M block with either by-pass mode or context modeling. In other words, video encoder 20 may encode the position (i, j) using by-pass mode or context modeling for identifying the sub-block whose line-based partition pattern was determined, and video decoder 30 may decode the position (i, j) using by-pass mode or context modeling to identify the sub-block whose line-based partition pattern was received.

Alternatively or additionally, video encoder 20 and video decoder 30 may be pre-configured to set the specific M×M block to always start at either the left boundary M×M block or the bottom boundary M×M block of the current PU. In this case, video encoder 20 may signal a flag and only one offset is further signaled by the encoder. For instance, in this example, video encoder 20 may signal a flag and one offset for identifying the sub-block whose line-based partition pattern was determined, and video decoder 30 may receive a flag and one offset to identify the sub-block whose line-based partition pattern was received.

In some cases, instead of signaling the horizontal and vertical index in M×M unit within one N×N block, video encoder 20 may identify the M×M block by a quad-tree structure, wherein each level representation has zero or more "0s" and one "1" and terminates and proceeds to a lower level once a "1" is reached. In this example, video encoder 20 may not need to signal information for identifying the sub-block and video decoder 30 may not need to receive information to identify the sub-block. For instance, video decoder 30 may similarly use the quad-tree structure to determine the M×M block for which video decoder 30 determined a partition pattern for determining the partition pattern for the N×N depth block.

In some examples, video encoder 20 and video decoder 30 may extend the line-based partition pattern of the specific M×M block to a larger N×N block in a way that the partition patterns of all M×M blocks inside the N×N block, if available, together form a line-based partition for the whole PU (i.e., whole depth block). For example, at the top-right corner of a particular M×M block is the bottom-left corner of another M×M block within an N×N block. In some examples, video encoder 20 and video decoder 30 may extend the linear line (e.g., partition line) that bisects a particular M×M block through the other block connected to the top-right corner of the particular M×M block. Similarly, at the bottom-left corner of the particular M×M block is the top-right corner of yet another M×M block within the N×N block. In some examples, video encoder 20 and video decoder 30 may extend the linear line (e.g., partition line) that bisects a particular M×M block through the other block connected to the bottom-left corner of the particular M×M block. In this way, video encoder 20 and video decoder 30 may extend the line-based partition of a specific M×M block to the whole PU.

As described above, video encoder 20 and video decoder 30 may be configured to extend the linear line that bisects the smaller sized block such that the linear line bisects the larger sized block for determining the partition pattern for the larger sized depth block. In some examples, to extend the specific M×M line-based partition pattern to the current PU (i.e., to the whole larger sized depth block), video encoder 20 and video decoder 30 may first derive the partition boundary line function y=a*x+b, by (M*i, M*j) and the start and end point positions of the M×M partition pattern, where a and b represent the slope and the intercept of the partition boundary line, respectively. In other words, video encoder 20 and video decoder 30 may determine the line-equation of the linear line based on the slope-line formula. With the partition boundary line function, video encoder 20 and video decoder 30 may derive an N×N partition pattern (referred to as bPattern), which is an N×N binary block, as bPattern[x][y]=(y−a*x)<b?1:0, where x, y=0, 1, . . . N−1. In one example, furthermore, a and b are rounded to integers.

When DMM mode 3 or 4 is enabled, a specific M×M block may be signaled by video encoder 20 and received by video decoder 30. In addition, inside the M×M block, video encoder 20 signals the line-based partition pattern (e.g., the Wedgelet pattern) in a way similar to how video encoder 20 signals the Wedgelet pattern in DMM mode 3 for an M×M PU (i.e., M×M block) as in the current 3D-HEVC. In this case, video encoder 20 may signal a Wedgelet sub-set index relative to an M×M PU (i.e., M×M block).

As described above, with the techniques described in this disclosure, there may be a reduction in the number of partition patterns that are needed for larger sized blocks. For example, in the techniques described in this disclosure, only up to N/M (or 2×N/M) M×M blocks may need a partition (i.e., video encoder 20 and video decoder 30 may need to construct partition lists that includes only up to N/M (or 2×N/M) M×M blocks). Accordingly, video encoder 20 may only need to signal partition patterns for up to N/M (or 2×N/M) M×M blocks, and derive or extend up to N/M (or 2×N/M) M×M blocks. Similarly, video decoder 30 may only need to receive partition patterns for up to N/M (or 2×N/M) M×M blocks, and derive or extend up to N/M (or 2×N/M) M×M blocks.

Furthermore, as described above, the techniques described in this disclosure may reduce the number of partition patterns that need to be stored and reduce the complexity of implementing intra-prediction using partition patterns. Accordingly, the techniques may overcome the issues with supporting line-based partitioning (e.g., Wedgelet partitioning) for 64×64 sized depth blocks. In other words, instead of supporting only up to 32×32 line-based partition as in the current 3D-HEVC, using the techniques described in this disclosure, the Wedgelet pattern is extended to N×N PU, which may be 64×64.

In addition to describing techniques for using line-based partition patterns for N×N sized depth blocks (i.e., not limited to less than or equal to 32×32 sized depth blocks), the disclosure describes techniques to increase the efficiency of implementing intra-prediction encoding and decoding for line-based partitioning (e.g., Wedgelet partitioning). For example, at video encoder 20, to accelerate the Wedgelet searching process for a N×N depth PU (i.e., depth block) in DMM 1, when the top-left, top-right, bottom-left and bottom-right samples of the current depth PU (i.e., depth block) in the original depth picture have the same value, video encoder 20 may skip the Wedgelet pattern searching process and video encoder 20 may be configured to not select DMM 1 for the current PU (i.e., current depth block).

As another example, alternatively or additionally, video encoder 20 may check values of multiple neighboring current depth PUs. Video encoder 20 may determine whether the searching process is skipped and DMM 1 based on the values of the neighboring current depth PUs, and may select DMM1 for current PU based on the determination. Alternatively or additionally, video encoder 20 may skip the Wedgelet pattern searching and select a one-sample partition pattern (e.g., the top-left sample belongs to a different partition of all other samples) when the top-left, top-right, bottom-left and bottom-right samples of the current depth PU in the original depth picture have the same value.

In some examples, in DMM 3 mode, if the N×N Wedgelet subset specified by the co-located texture luma intra mode is empty, video encoder 20 may skip the DMM 3 mode for current PU. The co-located texture luma intra mode being empty means that the luma component of the co-located texture block is not intra-prediction encoded or decoded. For example, if the luma component of the co-located texture block is inter prediction coded, there is no available luma intra mode. Alternatively or additionally, video decoder 30 may be constrained in a way that if the N×N Wedgelet subset specified by the co-located texture luma intra mode is empty, the DMM mode index decoded by the video decoder 30 can never be DMM 3 mode for the current PU.

As described above, for DMM 3, video encoder 20 and video decoder 30 may determine the partition pattern for the depth block based on the co-located texture block. However, the techniques described in this disclosure are not so limited. In some examples, in DMM 3 mode, video encoder 20 and video decoder 30 may not derive the Wedgelet partition pattern by the luma block that is co-located with the current N×N PU. Rather, video encoder 20 and video decoder 30 may determine the line-based partition pattern by the luma block that is co-located with the current M×M block.

For a Wedgelet pattern using half-sample accuracy of start/end point positions of an N×N PU, video encoder 20 and video decoder 30 may determine to which partition the position (m, n) belongs based on the partition to which the decision position (2m, 2n) belongs in an 2N×2N PU with the corresponding Wedgelet pattern. Video encoder 20 and video decoder 30 may determine to which partition the position (m, n) belongs without shifting the decision position (2m, 2n) in the 2N×2N block, with an offset vector of (offsetX, offsetY), wherein offsetX or offsetY is equal to 0 or 1 and depending on various conditions as in current 3D-HEVC.

Figure 6:
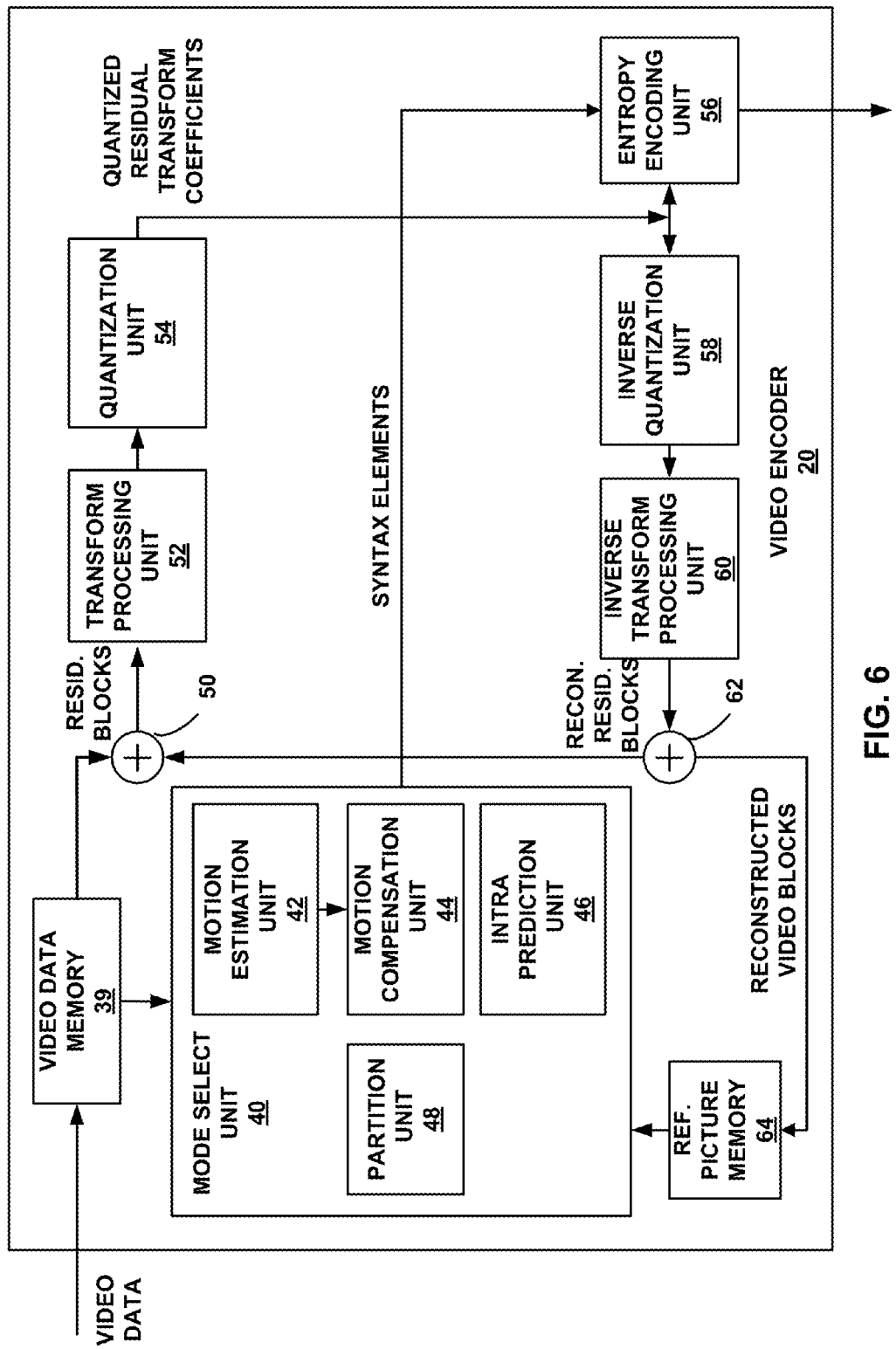
FIG. 6 is a block diagram illustrating an example of video encoder that may implement techniques for depth coding.

FIG. 6 is a block diagram illustrating an example of video encoder 20 that may implement techniques for depth coding. Video encoder 20 may perform intra- and inter-coding of video blocks within video slices. Intra-coding (i.e., intra-prediction coding) relies on spatial prediction to reduce or remove spatial redundancy in video within a given video frame or picture. Inter-coding (i.e., inter-prediction coding) relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As noted above, video encoder 20 may be adapted to perform multiview video coding. In some instances, video encoder 20 may be configured to code multi-view HEVC, such that each view in a time instance may be processed by a decoder, such as video decoder 30. For HEVC-3D, in addition to encoding texture maps (i.e., luma and chroma values) for each view, video encoder 20 may further encode a depth map for each view.

In any case, as shown in FIG. 6, video encoder 20 receives a current video block within a video picture to be encoded. In the example of FIG. 6, video encoder 20 includes video memory data 39, mode select unit 40, reference picture memory 64 (also referred to as decoded picture buffer (DPB) 64), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 6) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

As shown in FIG. 6, video data memory 39 receives video data that is used for encoding a current video block within a video picture. Video data memory 39 may store video data to be encoded by the components of video encoder 20 (e.g., configured to store video data) or store video data that is to be used for encoding video pictures. For example, video data memory 39 may store partition patterns (e.g., Wedgelet partition patterns) for blocks of different sizes. Video data memory 39 may store the partition patterns as part of the initialization process implemented by video encoder 20.

In some examples, the video data stored in video data memory 39 may be obtained, for example, from video source 18. Reference picture memory 64 (also referred to as a decoding picture buffer (DPB)) stores reference video data for use in encoding video data by video encoder 20 (e.g., in intra-coding modes or inter-coding modes). Video data memory 39 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 39 and reference picture memory 64 may be provided by the same memory device or separate memory devices. In various examples, video data memory 39 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding (e.g., intra-prediction encoding) of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provide the resulting intra- or inter-coded block to summer 50 to generate residual block data and to summer 62 to reconstruct the encoded block for use as a reference frame. Mode select unit 40 may also provide syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map. For example, intra-prediction unit 46 uses intra-prediction modes from the base (2D) HEVC standard (as described, for example, with respect to FIG. 2 above), depth modeling modes (DMMs) (as described, for example, with respect to FIGS. 3A and 3B above), and region boundary chain coding (as described, for example, with respect to FIG. 10 below) to code an intra-predicted PU of a depth slice.

In any case, video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this sense, video encoder 20 may be configured to implement one or more example techniques described in this disclosure. For example, intra-prediction unit 46 may be configured to implement the example intra-prediction encoding techniques for a depth block described in this disclosure. In some examples, intra-prediction unit 46 in combination with other processors may be configured to implement the techniques described in this disclosure.

In some examples, video encoder 20 may be configured to determine a partition pattern from partition patterns for blocks of a first size (e.g., determine a partition pattern associated with a block of size 16×16). Video encoder 20 may determine a partition for a depth block of a second size based on the determined partition pattern from the partition patterns for blocks of the first size, where the second size is larger than the first size (e.g., determine a partition for a depth block of size 32×32 based on the determined partition pattern associated with a block of size 16×16). Video encoder 20 may intra-prediction encode the depth block based on the determined partition pattern for the depth block.

In this example, the block of size 16×16 (e.g., a block of the first size) may not be an actual block within the picture that includes the depth block. Rather, the block of size 16×16 is a conceptual block, where the partition patterns that are used for a block of size 16×16 are instead used for a block of size 32×32 (e.g., depth block of the second size). However, in some examples, the block of size 16×16 may be an actual block of the picture, or a block within the block of size 32×32.

Video encoder 20 may be configured to determine a partition pattern (e.g., line-based partition pattern) for a sub-block (e.g., an M×M block) of a depth block (e.g., an N×N block that is a current PU) for intra depth encoding. Video encoder 20 may determine a partition pattern (e.g., a line-based partition pattern) for the whole depth block based on the partition pattern for the sub-block. Video encoder 20 may intra-encode the depth block based on the determined partition pattern for the depth block.

Video encoder 20 may encode information indicating the partition pattern for the sub-block. Video encoder 20 may also avoid the encoding (e.g., not encode) of information indicating the partition pattern for the depth block. Video encoder 20 may also determine the partition pattern for the depth block without basing the partition pattern for the depth block on a size of the depth block (e.g., independent of the block size). Video encoder 20 may also, in some examples, encode (e.g., using by-pass mode and/or context modeling) and signal information for identifying the sub-block whose partition pattern was determined (e.g., an index or a flag and one offset).

Figure 7:
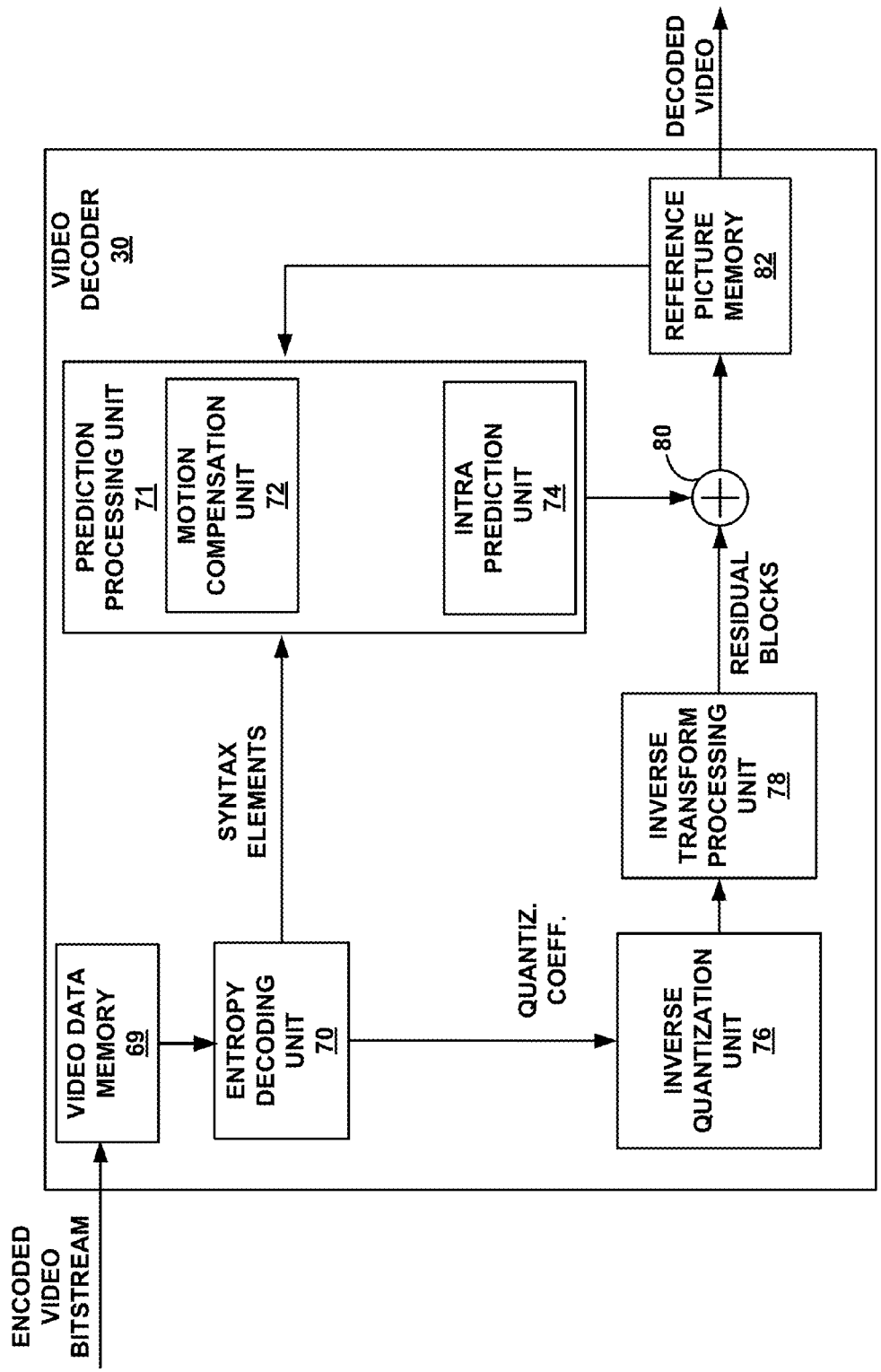
FIG. 7 is a block diagram illustrating an example of video decoder that may implement techniques for depth coding.

FIG. 7 is a block diagram illustrating an example of video decoder 30 that may implement techniques for depth coding. In the example of FIG. 7, video decoder 30 includes video data memory 69, an entropy decoding unit 70, and prediction processing unit 71 that includes motion compensation unit 72, motion vector prediction unit 73, and intra prediction unit 74. Video decoder 30 also includes inverse quantization unit 76, inverse transform processing unit 78, reference frame memory 82 and summer 80. Video decoder 30 may, in some examples, perform a decoding pass generally reciprocal to the encoding pass described with respect to video encoder 20 (FIG. 6). Motion compensation unit 72 may generate prediction data based on motion vectors received from entropy decoding unit 70, while intra-prediction unit 74 may generate prediction data based on intra-prediction mode indicators received from entropy decoding unit 70.

In the example of FIG. 7, video data memory 69 receives encoded video. Video data memory 69 may store video data (e.g., configured to store video data), such as an encoded video bitstream, to be decoded by the components of video decoder 30. Video data memory 68 may also store video data that is used by components of video decoder 30 to decode the video data and reconstruct a picture. For example, video data memory 69 may store partition patterns (e.g., Wedgelet partition patterns) for blocks of different sizes. Video data memory 69 may store the partition patterns as part of the initialization process implemented by video encoder 30.

The video data stored in video data memory 69 may be obtained from a local video source, such as a camera, via wired or wireless network communication of video data, or by accessing physical data storage media. Video data memory 69 may form a coded picture buffer (CPB) that stores encoded video data from an encoded video bitstream.

Reference picture memory 82 is one example of a decoded picture buffer (DPB) that stores reference video data for use in decoding video data by video decoder 30 (e.g., in intra-coding mode, and inter-coding mode). Video data memory 69 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and reference picture memory 82 may be provided by the same memory device or separate memory devices. In various examples, video data memory 69 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Entropy decoding unit 70 forwards information for intra-prediction decoding to intra-prediction unit 74. Video decoder 30 may receive the syntax elements at the video slice level and/or the video block level.

As noted above, video decoder 30 may be adapted to perform multiview video coding. In some instances, video decoder 30 may be configured to decode multi-view HEVC. For HEVC-3D, in addition to decoding texture values (i.e., luma and chroma values) for each view, video decoder 30 may further decode a depth map for each view.

In any case, when the video slice is coded as an intra-coded (I) slice, intra-prediction unit 74 may generate prediction data for a video block of the current video slice based on a signaled intra prediction mode and data from previously decoded blocks of the current frame or picture.

Intra-prediction unit 74 may also intra-code depth data. For example, intra-prediction unit 74 use intra-prediction modes from the base (2D) HEVC standard (as described, for example, with respect to FIG. 2 above), depth modeling modes (DMMs) (as described, for example, with respect to FIGS. 3A and 3B above), and region boundary chain coding (as described, for example, with respect to FIG. 10 below) to code an intra-predicted PU of a depth slice.

When the video frame is coded as an inter-coded (i.e., B (bi-directionally predicted), P (predicted from a previous frame) or GPB (generalized P or B slice)) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform processing unit 78 applies an inverse transform, e.g., an inverse DCT, an inverse integer transform, or a conceptually similar inverse transform process, to the transform coefficients in order to produce residual blocks in the pixel domain. After motion compensation unit 72 or intra-prediction unit 74 generates the predictive block for the current video block (e.g., a texture block or a depth block) based on motion vectors or other syntax elements, video decoder 30 forms a decoded video block by summing the residual blocks from inverse transform unit 78 with the corresponding predictive blocks generated by motion compensation unit 82 or intra-prediction unit 74. Summer 90 represents the component or components that perform this summation operation.

If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this sense, video decoder 30 may be configured to implement one or more example techniques described in this disclosure. For example, intra-prediction unit 72 may be configured to implement the example intra-prediction decoding techniques for a depth block described in this disclosure. In some examples, intra-prediction unit 72, alone or in combination with other processors, may be configured to implement the techniques described in this disclosure.

In some examples, video decoder 30 may be configured to determine a partition pattern from partition patterns for blocks of a first size (e.g., determine a partition pattern associated with a block of size 16×16). Video decoder 30 may determine a partition for a depth block of a second size based on the determined partition pattern from the partition patterns for blocks of the first size, where the second size is larger than the first size (e.g., determine a partition for a depth block of size 32×32 based on the determined partition pattern of the block of size 16×16). Video decoder 30 may intra-prediction decode the depth block based on the determined partition pattern for the depth block.

In this example, the block of size 16×16 (e.g., a block of the first size) may not be an actual block within the picture that includes the depth block. Rather, the block of size 16×16 is a conceptual block, where the partition patterns that are used for a block of size 16×16 are instead used for a block of size 32×32 (e.g., depth block of the second size). However, in some examples, the block of size 16×16 may be an actual block of the picture, or a block within the block of size 32×32.

For example, video decoder 30 may be configured to determine a partition pattern (e.g., receive information indicating the partition pattern) for a sub-block (e.g., an M×M block) of a depth block (e.g., an N×N block that is a current PU) for intra depth decoding. The partition pattern may be a line-based partition pattern. Video decoder 30 may determine a partition pattern (e.g., a line-based partition pattern) for the whole depth block based on the partition pattern for the sub-block. Video decoder 30 may intra-decode the depth block based on the determined partition pattern for the depth block.

Video decoder 30 may decode information indicating the partition pattern for the sub-block. Video decoder 30 may also avoid the decoding (e.g., not decode) of information indicating the partition pattern for the depth block. In other words, video decoder 30 may determine the partition pattern for the depth block without receiving information indicating the partition pattern for the depth block.

Video decoder 30 may also determine the partition pattern for the depth block without basing the partition pattern for the depth block on a size of the depth block (e.g., independent of the block size). Video decoder 30 may also, in some examples, decode (e.g., using by-pass mode and/or context modeling) received information for identifying the sub-block whose partition pattern was determined (e.g., an index or a flag and one offset).

The techniques described above may be performed by video encoder 20 (FIGS. 1 and 6) and/or video decoder 30 (FIGS. 1 and 7), both of which may be generally referred to as a video coder. In addition, video coding may generally refer to video encoding and/or video decoding, as applicable.

Figure 8:
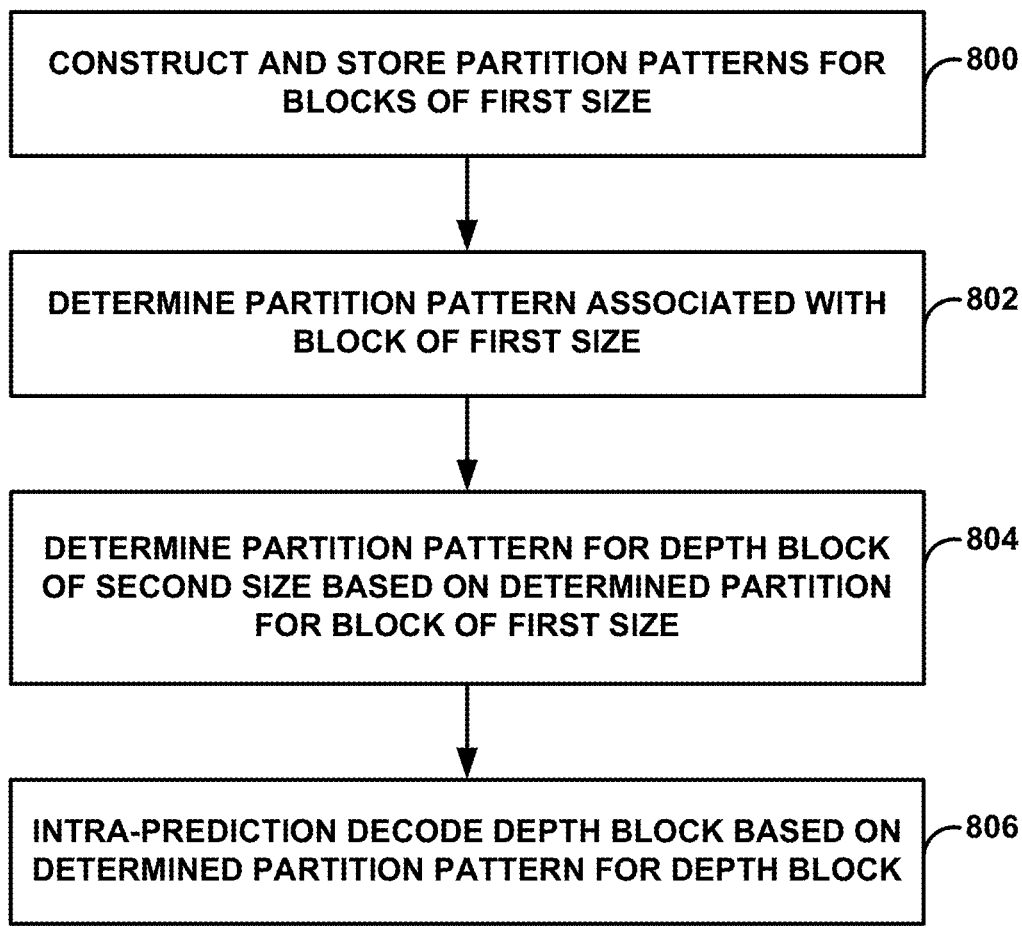
FIG. 8 is a flowchart illustrating an example method of decoding video data.

FIG. 8 is a flowchart illustrating an example method of decoding video data. As illustrated, video decoder 30 may construct and store a partition patterns for blocks of a first size (800). For instance, video decoder 30 may construct a partition pattern list that includes one or more partition patterns associated with blocks of a first size (e.g., for blocks of size 16×16) as part of initialization and store the partition pattern list associated with blocks of the first size in video memory data 69.

Video decoder 30 may determine a partition pattern associated with a block of a first size (802). For example, video decoder 30 may receive an index into the partition pattern list associated with a block of the first size. Video decoder 30 may identify the partition pattern that is referenced by the index into the partition pattern list. Video decoder 30 may determine the partition pattern from the partition patterns associated with blocks of the first size based on the identified partition pattern (i.e., video decoder 30 may determine the partition pattern from partition patterns for blocks of the first size based on the received index into the partition pattern list).

Video decoder 30 may determine a partition pattern for a depth block of a second size (e.g., 32×32) based on the determined partition pattern from the partition patterns for blocks of the first size (e.g., 16×16) (804). In this example, the second size is larger than the first size.

The block of the first size need not necessarily be an actual block within the picture. Rather, it is the partition pattern of a block of the first size that video decoder 30 uses to determine a partition pattern for a depth block of a second, larger size. In some examples, however, the block of the first size may be an actual block within the picture, such as within the depth block.

In some examples, video decoder 30 may receive information identifying a sub-block within the depth block, where a size of the sub-block is the first size. In such examples, video decoder 30 may determine the partition pattern for the sub-block. Video decoder 30 may also determine the partition pattern for the depth block of the second size based on the determined partition pattern for the sub-block. Also, in these example techniques, video decoder 30 may determine the partition pattern for the depth block of the second size by extending a linear line of the partition pattern for the sub-block to boundaries of the depth block. A resulting linear line comprises the partition pattern for the depth block.

Video decoder 30 may intra-prediction decode the depth block based on the determined partition pattern for the depth block (806). For example, video decoder 30 may implement intra-prediction decoding techniques described in 3D-HEVC that rely on DMM to intra-prediction decode the depth block. In some examples, the partition pattern from the partition patterns for blocks of the first size comprises a line-based partition pattern from a plurality of line-based partition patterns for blocks of the first size (e.g., a Wedgelet pattern from a plurality of Wedgelet patterns for blocks of the first size). Also, the partition pattern for the depth block comprises a line-based partition pattern for the depth block that partitions the depth block into two partitions. In some examples, video decoder 30 may determine the partition pattern for the depth block of the second size without receiving information indicating the partition pattern for the depth block of the second size.

Figure 9:
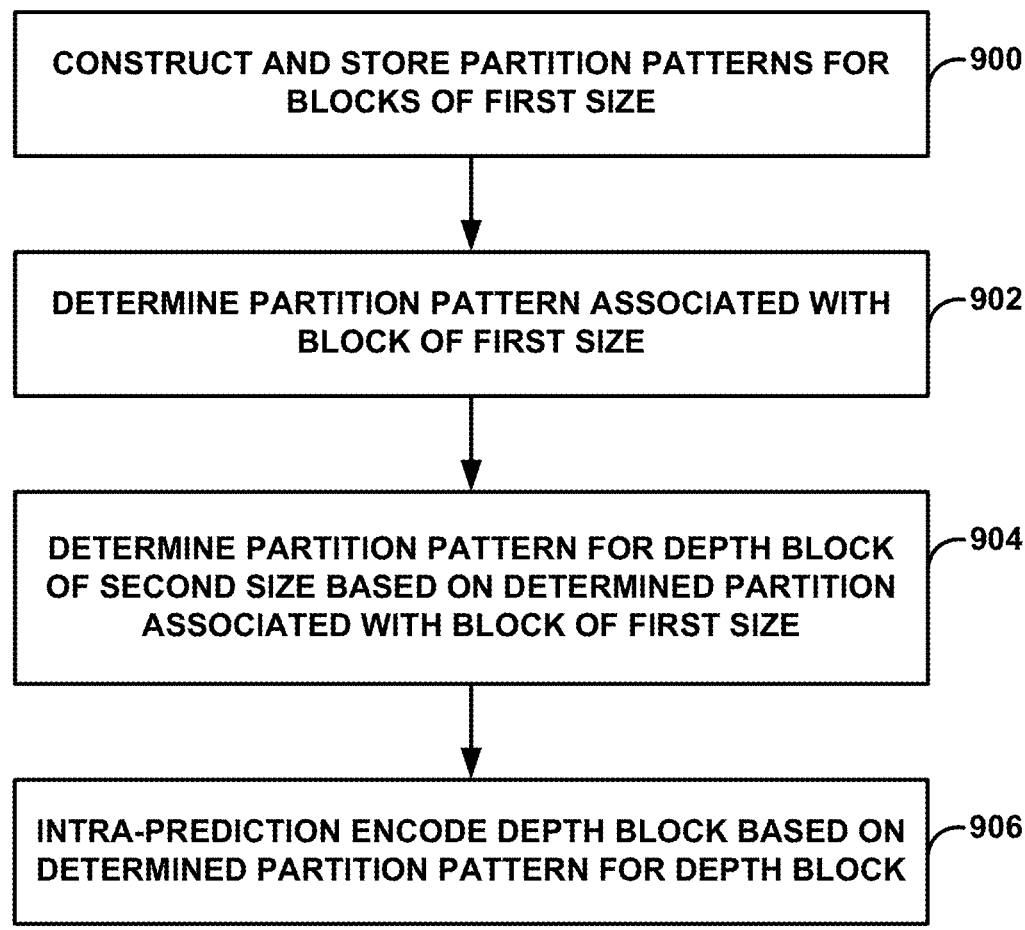
FIG. 9 is a flowchart illustrating an example method of encoding video data.

FIG. 9 is a flowchart illustrating an example method of encoding video data. As illustrated, video encoder 20 may construct and store a partition patterns associated with blocks of a first size (900). For instance, video encoder 20 may construct a partition pattern list associated with a block of a first size (e.g., for a block of size 16×16) as part of initialization and store the partition pattern list for blocks of the first size in video memory data 39.

Video encoder 20 may determine a partition pattern associated with a block of the first size (902). For example, video encoder 20 may implement multiple encoding passes to select the appropriate partition pattern that can be used to determine a partition pattern for a depth block of a second, larger size. Video encoder 20 may then identify a partition pattern in the partition pattern list. For example, video encoder 20 may determine the partition pattern from the partition pattern associated with blocks of the first size from a partition pattern identified in the constructed partition pattern list. Video encoder 20 may signal an index into the constructed partition pattern list that identifies the determine partition pattern from the partition patterns for blocks of the first size, where video decoder 30 uses the index to intra-prediction decode the depth block.

Video encoder 20 may determine a partition pattern for a depth block of a second size (e.g., 32×32) based on the determined partition pattern from the partition patterns for blocks of the first size (e.g., a partition pattern associated with a block of size 16×16) (904). In this example, the second size is larger than the first size.

The block of the first size need not necessarily be an actual block within the picture. Rather, it is the partition pattern of a block of the first size that video encoder 20 uses to determine a partition pattern for a depth block of a second, larger size. In some examples, however, the block of the first size may be an actual block within the picture, such as within the depth block.

In some examples, video encoder 20 may identify a sub-block within the depth block, where a size of the sub-block is the first size. In such examples, video encoder 20 may determine the partition pattern for the identified sub-block. Video encoder 20 may also determine the partition pattern for the depth block of the second size based on the determined partition pattern for the identified sub-block. Also, in these example techniques, video encoder 20 may determine the partition pattern for the depth block of the second size by extending a linear line of the partition pattern for the sub-block to boundaries of the depth block. A resulting linear line defines the partition pattern for the depth block.

Video encoder 20 may intra-prediction encode the depth block based on the determined partition pattern for the depth block (906). For example, video encoder 20 may implement intra-prediction encoding techniques described in 3D-HEVC that rely on DMM to intra-prediction encode the depth block. In some examples, the partition pattern from the partition patterns for blocks of the first size comprises a line-based partition pattern from a plurality of line-based partition patterns for blocks of the first size (e.g., a Wedgelet pattern from a plurality of Wedgelet patterns for blocks of the first size). Also, the partition pattern for the depth block comprises a line-based partition pattern for the depth block that partitions the depth block into two partitions. In some examples, video encoder 20 may not signal information identifying the partition pattern for the depth block of the second size.

The following describes some examples for implementing the example techniques described in this disclosure. In the following, double brackets ([[ ]]) encompassing bolded and italicized text indicates deletion relative to current techniques, and underlining indicates addition relative to current techniques. The following example techniques may be applied separately or in combination.

For Depth mode parameter syntax

|  | Descriptor |
|---|---|
| depth_mode_parameters( x0 , y0 , log2CbSize) { | |
|   if( ( log2CbSize = = 3 &&PartMode[ xC ][ yC ] = = PART_2Nx2N ) | |
|     || ( log2CbSize> 3 &&log2CbSize< 6) ) | |
|     depth_intra_mode_set_indication_flag | ae(v) |
|   depth_intra_mode[ x0 ][ y0 ] | ae(v) |
|   if ( DepthIntraMode[ x0 ][ y0 ] = = INTRA_DEP_DMM_WFULL || | |
|     DepthIntraMode[ x0 ][ y0 ] = = INTRA_DEP_SDC_DMM_WFULL ){ | |
|     wedge_full_tab_idx[ x0 ][ y0 ] | ae(v) |
|     wedge_sub_col[ x0 ][ y0 ] | u(v) |
|     wedge_sub_row[ x0 ][ y0 ] | u(v) |
|   } | |
|   else if( DepthIntraMode[ x0 ][ y0 ] = = INTRA_DEP_DMM_WPREDTEX ){ | |
|     wedge_predtex_tab_idx[ x0 ][ y0 ] | [[ae(v)]]ae(4) |
|     wedge_sub_col[ x0 ][ y0 ] | u(v) |
|     wedge_sub_row[ x0 ][ y0 ] | u(v) |
|   } else if( DepthIntraMode[ x0 ][ y0 ] = = INTRA_DEP_CHAIN ) { | |
|     edge_start_left_flag[ x0 ][ y0 ] | ae(v) |
|     edge_start_position[ x0 ][ y0 ] | ae(v) |
|     num_edge_codes_minus1[ x0 ][ y0 ] | ae(v) |
|     for( k = 0; k <= num_edge_codes_minus1; k++) | |
|       edge_code[ k ] | ae(v) |
|   } | |
|   ... | |
| } | |

For the Depth mode parameter intra semantics:
. . .

wedge_full_tab_idx[x0][y0] specifies the index of the wedgelet pattern in the corresponding 4×4 pattern list when DepthIntraMode[x0][y0] is equal to INTRA_DEP_DMM_WFULL.

wedge_sub_col[x0][y0] and wedge_sub_row[x0][y0] specify the position of the 4×4 block for which the wedgelet pattern is signalled.

wedge_predtex_tab_idx[x0][y0] specifies the index of the wedgelet pattern of the 4×4 block within the current prediction unit when DepthIntraMode[x0][y0] is equal to INTRA_DEP_DMM_WPREDTEX.

For the Decoding process
H.8.4.4.2.7 Specification of intra prediction mode INTRA_DMM_WFULL
Inputs to this process are:
  a sample location (xTb, yTb) specifying the top-left sample of the current block relative to the top-left sample of the current picture,
  the neighbouring samples p[x][y], with x=−1, y=−1 . . . nTbS*2−1 and x=0 . . . nTbS*2−1, y=−1,
  a variable nTbS specifying the transform block size, Output of this process is:
   the predicted samples predSamples[x][y], with x, y=0 . . . nTbS−1.
The values of the prediction samples predSamples[x][y], with x, y=0 . . . nTbS−1, are derived as specified by the following ordered steps:
   1. The Wedgelet pattern extension process as specified in subclause H.8.4.4.2.12.3 is invoked with Log 2(nTbS), wedge_full_tab_idx[xTb][yTb], wedge_sub_col[xTb][yTb] and wedge_sub_row[xTb][yTb] as inputs, and the output is assigned to wedgePattern. [[The variable wedgePattern[x][y] with-x, y=0 . . . nTbS−1, specifying a binary partition pattern is derived as. wedgePattern=WedgePatternTable[Log 2(nTbS)][wedge_full_tab_idx[xTb][yTb]] (H-39)]]
   2. The depth partition value derivation and assignment process as specified in subclause H.8.4.4.2.11 is invoked with the neighbouring samples p[x][y], the binary pattern wedgePattern[xTb][yTb], the transform size nTbS, the dcOffsetAvailFlag set equal to dmm_dc_flag[xTb][yTb], intraChainFlag set equal to 0, and the DC Offsets DcOffset[xTb][yTb][0], and DcOffset[xTb][yTb][1] as inputs and the output is assigned to predSamples[x][y].
   3. [[For x, y=0 . . . nTbs−1, inclusive the following applies: WedgeIdx[ xTb+x][yTb+y] is set equal to wedge_full_tab_idx[xTb][yTb].]]

H.8.4.4.2.8 Specification of intra prediction mode INTRA_DMM_WPREDTEX
Inputs to this process are:
   a sample location (xTb, yTb) specifying the top-left sample of the current block relative to the top-left sample of the current picture,
   the neighbouring samples p[x][y], with x=−1, y=−1 . . . nTbS*2−1 and x=0 . . . nTbS*2−1, y=−1,
   a variable nTbS specifying the transform block size,
Output of this process is:
   the predicted samples predSamples[x][y], with x, y=0 . . . nTbS−1.
The values of the prediction samples predSamples[x][y], with x, y=0 . . . nTbS−1, are as follows:
   Depending on textureIntraPredMode, the variable wedgeIdx is derived as specified in the following:
      candWedgeIndList=TextModePredWedgeIndTable [[[Log 2(nTbS)]]2][TextureIntraPredMode [xTb][yTb]] (H-40)
      wedgeIdx=candWedgeIndList[wedge_predtex_tab_idx[xTb][yTb]] (H-41)
   The Wedgelet pattern extension process as specified in subclause H.8.4.4.2.12.3 is invoked with Log 2(nTbS), wedgeIdx, wedge_sub_col[xTb][yTb] and wedge_sub_row[xTb][yTb] as inputs, and the output is assigned to wedgePattern. [[The variable wedgePattern[x][y] with x, y=0 . . . nTbS−1, specifying a binary partition pattern is derived as.
      wedgePattern=WedgePatternTable[Log 2(nTbS)][wedgeIdx](H-42)]]
   The depth partition value derivation and assignment process as specified in subclause H.8.4.4.2.11 is invoked with the neighbouring samples p[x][y], the binary pattern wedgePattern[x][y], the transform size nT, the dcOffsetAvailFlag set equal to dmm_dc_flag[xTb][yTb], intraChainFlag set equal to 0, and the DC Offsets DcOffset[xTb][yTb][0], and DcOffset[xTb][yTb][1] as inputs and the output is assigned to predSamples[x][y].

H.8.4.4.2.12.3 Wedgelet pattern extension process
Inputs to this process are:
   a variable log 2BlkSize specifying the binary partition pattern size
   a variable subIdx specifying a 4×4 Wedgelet index,
   a variable xSub specifying the horizontal position of a left-top 4×4 block,
   a variable ySub specifying the vertical position of a left-top 4×4 block.
Output of this process is:
   binary array wedgePattern[x][y] of size (1<<log 2BlkSize)×(1<<log 2BlkSize)
The variable xS and yS specifying the partition line start position of a 4×4 Wedgelet pattern are derived as follows:
   xS=WedgeStartPos[2][subIdx][0];
   yS=WedgeStartPos[2][subIdx][1];
The variable xE and yE specifying the partition line end position of a 4×4 Wedgelet pattern are derived as follows:
   xE=WedgeEndPos[2][subIdx][0];
   yE=WedgeEndPos[2][subIdx][1];
If log 2BlkSize is equal to 2, the following applies
   WedgePatternTable[2][subIdx] is assigned to wedgePattern;
Otherwise, the following applies:
   If xS !=xE or yS !=yE, the followings applies:
      a=(yE−yS);
      b=(yE+(ySub<<3))*(xE−xS)−a*(xE+(xSub<<3));
      For x, y=0 . . . blkSize−1
      wedgePattern[x][y]=((y*(xE−xS)−a*x)<<1)<b?1:0
   Otherwise, the following applies:
      For x, y=0 . . . blkSize−1
      If ySub==0, the followings applies:
      wedgePattern[x][y]=x<(xSub<<2)?1:0
         Otherwise, the followings applies:
      wedgePattern[x][y]=y<(ySub<<2)?1:0

H.8.4.4.3 Depth value reconstruction process
Inputs to this process are:
   a luma location (xTb, yTb) specifying the top-left luma sample of the current block relative to the top-left luma sample of the current picture,
   a variable nTbS specifying the transform block size,
   predicted samples predSamples[x][y], with x, y=0 . . . nTbS−1
   the intra prediction mode predModeIntra,
Output of this process is:
   reconstructed depth value samples resSamples[x][y], with x, y=0 . . . nTbS−1.
Depending on predModeIntra the array wedgePattern[x][y] with x, y=0 . . . nTbS−1 specifying the binary segmentation pattern is derived as follows.
   If predModeIntra is equal to INTRA_DMM_WFULL, the Wedgelet pattern extension process as specified in subclause H.8.4.4.2.12.3 is invoked with Log 2(nTbS), wedge_full_tab_idx[xTb][yTb], wedge_sub_col[xTb][yTb] and wedge_sub_row[xTb][yTb] as inputs, and the output is assigned to wedgePattern. [[the following applies. wedgePattern=WedgePatternTable[Log 2(nTbS)][wedge_full_tab_idx[xTb][yTb]]]]
   Otherwise (predModeIntra is not equal to INTRA_DMM_WFULL), the following applies.
      For x, y=0 . . . nTbS−1 wedgePattern[x][y] is set equal to 0.
Depending on dlt_flag[nuh_layer_id] the reconstructed depth value samples resSamples[x][y] are derived as specified in the following:

If dlt_flag[nuh_layer_id] is equal to 0, the following applies:
  For x, y=0 . . . nTbS−1, the reconstructed depth value samples
  resSamples[x][y] are derived as specified in the following:
    resSamples[x][y]=predSamples[x][y]+SdcResidual[xTb][yTb][wedgePattern[x][y]] (H-59)
Otherwise (dlt_flag[nuh_layer_id] is equal to 1), the following applies:
  The variables dcPred[0] and dcPred[1] are derived as specified in the following:
    If predModeIntra is equal to INTRA_DC, the following applies:
      dcPred[0]=predSamples[nTbS−1][nTbS−1] (H-60)
    Otherwise, if predModeIntra is equal to INTRA_PLANAR, the following applies:
      dcPred[0]=(predSamples[0][0]+predSamples[0][nTbS−1]+predSamples[nTbS−1][0]+predSamples[nTbS−1][nTbS−1]+2)>>2 (H-61)
    Otherwise, (predModeIntra is equal to INTRA_DMM_WFULL), the following applies.
      dcPred[wedgePattern[0][0]]=predSamples[0][0] (H-62)
      dcPred[wedgePattern[nTbS−1][0]]=predSamples[nTbS−1][0] (H-63)
      dcPred[wedgePattern[0][nTbS−1]]=predSamples[0][nTbS−1] (H-64)
      dcPred[wedgePattern[nTbS−1][nTbS−1]]=predSamples[nTbS−1][nTbS−1] (H-65)
  For x, y=0 . . . nTbS−1, the reconstructed depth value samples resSamples[x][y] are derived as specified in the following:
    dltIdxPred=DepthValue2Idx[dcPred[wedgePattern[x][y]] ] (H-66)
    dltIdxResi=SdcResidual[xTb][yTb][wedgePattern[x][y]] (H-67)
    resSamples[x][y]=predSamples[x][y]+Idx2DepthValue[dltIdxPred+dltIdxResi]−dcPred[wedgePattern[x][y]] (H-68)

In a second example technique, similar to the first example technique, but the following changes to the decoding process of current 3D-HEVC are also included. This second example technique is described to derive which partition a position (m, n) belongs to in an N×N PU with an N×N Wedgelet pattern according to which partition the decision position (2m, 2n) belongs to in an 2N×2N PU with the corresponding Wedgelet pattern, and the shifting of the decision position (2m, 2n) in the 2N×2N block, i.e., an offset vector of (offsetX, offsetY) added on (2m, 2n), wherein offsetX or offsetY is equal to 0 or 1 and depending on various conditions as in current 3D-HEVC, is removed. In some examples, this change may be made in conjunction with the techniques described above with respect to example one. In other examples, this change may be made independent to the techniques as described in the first example technique as well.

H.8.4.4.2.12.1 Wedgelet pattern generation process
. . .
  4. The binary partition pattern wedgePattern[x][y], with x, y=0 . . . patternSize−1, is derived as specified in the following.
    If resShift is equal to 1, the following applies.
      [[Depending on wedgeOri, the variables xOff and yOff are set as specified in Table H-8.

TABLE H-8

Specification of xOff, yOff

| wedgeOri | ( xS + xE ) < curSize | xOff | yOff |
|---|---|---|---|
| 0 |  | 0 | 0 |
| 1 |  | 1 | 0 |
| 2 |  | 1 | 1 |
| 3 |  | 0 | 1 |
| 4 | 0 | 1 | 0 |
| 4 | 1 | 0 | 0 |
| 5 | 0 | 0 | 1 |
| 5 | 1 | 0 | 0 |

]]
    For x, y=0 . . . patternSize−1 the following applies:
      wedgePattern[x][y]=curPattern[(x<<1)+[[xOff]]][(y<<1) [[+yOff]]] (H-58)
    Otherwise (resShift is not equal to 1), wedgePattern is set equal to curPattern.

Similar to the first example technique, but the following changes (indicated with underlining and bolding, relative to the first example technique) are also further included to cover the one-sample partition (the top-left sample in the partition pattern belongs to a different partition of all other samples) in proposed method for N×N (N>4) wedgelet patterns, and such one-sample partition may not be able to be generated using the first example technique.

H.8.4.4.2.12.3 Wedgelet pattern extension process
Inputs to this process are:
  a variable log 2BlkSize specifying the binary partition pattern size
  a variable subIdx specifying a 4×4 Wedgelet index,
  a variable xSub specifying the horizontal position of a left-top 4×4 block,
  a variable ySub specifying the vertical position of a left-top 4×4 block,
Output of this process is:
  binary array wedgePattern[x][y] of size (1<<log 2BlkSize)×(1<<log 2BlkSize)
The variable xS and yS specifying the partition line start position of a 4×4 Wedgelet pattern are derived as follows:
  xS=WedgeStartPos[2][subIdx][0];
  yS=WedgeStartPos[2][subIdx][1];
The variable xE and yE specifying the partition line end position of a 4×4 Wedgelet pattern are derived as follows:
  xE=WedgeEndPos[2][subIdx][0];
  yE=WedgeEndPos[2][subIdx][1];
If log 2BlkSize is equal to 2, the following applies
  WedgePatternTable[2][subIdx] is assigned to wedgePattern;
Otherwise, the following applies:
If xS !=xE or yS !=yE, the followings applies:
  a=(yE−yS);
  b=(yE+(ySub<<3))*(xE−xS)−a*(xE+(xSub<<3));
    For x, y=0 . . . blkSize−1
    wedgePattern[x][y]==((y*(xE−xS)−a*x)<<1)<b?1:0
Otherwise, the following applies:
  For x, y=0 . . . blkSize−1
  If xSub==0 && ySub==0, the followings applies:
    wedgePattern[x][y]=(!x) && (!y)?1:0
    Otherwise, if ySub==0, the followings applies:
    wedgePattern[ x][y]=x<(xSub<<2)?1:0
    Otherwise, the followings applies:
    wedgePattern[x][y]=v<(ySub<<2)?1:0

While the techniques of this disclosure are generally described with respect to 3D-HEVC, the techniques are not limited in this way. The techniques described above may also be applicable to other current standards or future standards not yet developed. For example, the techniques for depth coding may also be applicable to a multi-view extension of HEVC (e.g., so called MV-HEVC), a scalable extension to HEVC, or other current or future standards having a depth component.

The following describes some additional techniques related to intra-prediction modes in 3D-HEVC. This disclosure is provided to further assist with understanding the techniques described in this disclosure. However, such techniques are not required for this disclosure, and may be utilized in conjunction with the techniques described in this disclosure or may be another example of the techniques described in this disclosure.

For Region Boundary Chain Coding Mode, in 3D-HEVC, region boundary chain coding mode is introduced together with the HEVC intra prediction modes and DMM modes to code an intra prediction unit of a depth slice. For brevity, "region boundary chain coding mode" is denoted by "chain coding" for simplicity in the texts, tables and figures described herein.

Figure 10:
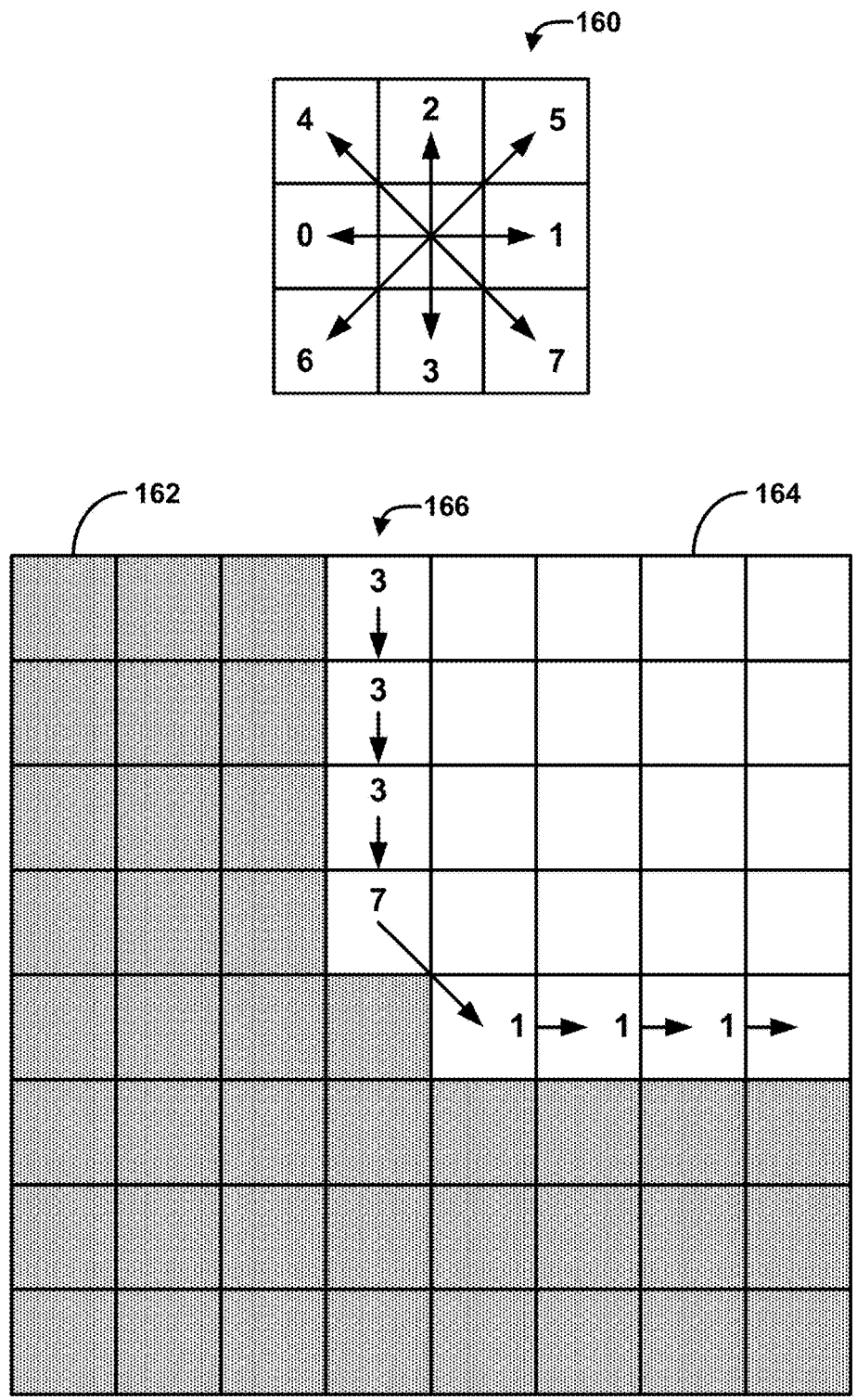
FIG. 10 is a conceptual diagram illustrating a region boundary chain coding mode.

Video encoder 20 may signal a chain coding of a PU with a starting position of the chain, the number of the chain codes and for each chain code, and a direction index. A chain is a connection between a sample and one of its eight-connectivity samples. As shown in FIG. 10, there are 8 different types of chain, each assigned with a direction index ranging from 0 to 7.

FIG. 10 is a conceptual diagram illustrating a region boundary chain coding mode. For example, the top part of FIG. 10 illustrates eight possible types of chain defined in chain coding. The bottom part of FIG. 10 illustrates one depth PU partition pattern and the coded chains in chain coding.

One example of the chain coding process is illustrated in FIG. 10. To signal the arbitrary partition pattern shown in FIG. 10, video encoder 20 may identify the partition pattern and encodes the following information in the bitstream. Video encoder 20 may encode one bit "0" to signal that the chains start from the top boundary. Video encoder 20 may encode three bits "011" to signal the starting position "3" at the top boundary. Video encoder 20 may encode four bits "0110" to signal the total number of chains as 7. Video encoder 30 may encode a series of connected chains indexes "3, 3, 3, 7, 1, 1, 1," where each chain index is converted to a code word using the look-up-table.

3D-HEVC includes a region boundary chain coding mode that allows explicit signaling of partition boundaries (e.g., rather than partitioning based on co-located texture component, as described above with respect to DMMs). As noted above, this disclosure may refer to "region boundary chain coding mode" as "chain coding."

In general, a chain is a connection between a sample and one of its eight-connectivity samples. As shown by block 160 of FIG. 10, there are eight different chain direction types, each assigned with a direction index ranging from 0 to 7. The chain direction types may aid a video coder in determining partitions of a depth block.

For example, the example of FIG. 10 includes a first partition 162 and a second partition 164 separated by a chain 166 that indicates the partitioning structure. A video encoder (such as video encoder 20) may determine and signal chain 166 for a PU in an encoded bitstream, while a video decoder (such as video decoder 30) may parse data representing chain 166 from an encoded bitstream.

In general, chain 166 includes a starting position, an indication of a number of links in the chain (e.g., a number of chain codes), and for each chain code, a direction index. Other types of signaling for chain 166 could also be used. In one example, to signal the arbitrary partition pattern shown in the example of FIG. 10, video encoder 20 may encode one bit (e.g., 0) to indicate that chain 166 begins from the top boundary. Video encoder 20 may encode three bits (e.g., 011) to indicate that chain 166 begins after the third depth sample of the top boundary. Video encoder 20 may encode four bits (e.g., 0110) to indicate that there are 7 total links in chain 166. Video encoder 20 may also encode a series of connected chains indexes (e.g., 3, 3, 3, 7, 1, 1, 1) to indicate the direction of each chain link (e.g., in accordance with block 160). In some examples, video encoder 20 may convert each index to a code word using a look-up-table. A video decoder, such as video decoder 30, may parse the signaling described above to determine the partitioning pattern of a block. Video decoder 30 may then decode depth values for each partition.

The techniques described in this disclosure may also function in conjunction with simplified depth coding (SDC), but the techniques are not so limited and may function in examples where SDC is not utilized. The following describes simplified depth coding (SDC) mode. SDC mode is introduced together with the HEVC intra prediction modes, DMM modes and chain coding mode to code an intra PU of a depth slice. In the current 3D-HEVC, SDC is only applied for 2N×2N PU partition size. Instead of coding quantized transform coefficients, SDC modes represent a depth block with the following two types of information: (1) the type of partition of the current depth block, including DMM mode 1 (2 partitions) and Planar (1 partition), and (2) for each partition, a residual value (in the pixel domain) is signaled in the bitstream.

Two sub-modes are defined in SDC including SDC mode 1 and SDC mode 2 which correspond to the partition type of Planar and DMM mode 1, respectively. Simplified residual coding is used in SDC. In simplified residual coding, one DC residual value is signaled for each partition of the PU, and no transform or quantization is applied.

It should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium and packaging materials.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of decoding video data, the method comprising:
   constructing a partition pattern list that includes one or more partition patterns associated with a block of a first size;
   receiving an index into the partition pattern list;
   determining a partition pattern associated with the block of the first size based on the received index into the partition pattern list;
   determining a partition pattern for a depth block of a second size based on the determined partition pattern associated with the block of the first size, wherein the second size is larger than the first size, and wherein the depth block is a block of a depth map in a framework of three-dimensional (3D) video coding; and
   intra-prediction decoding the depth block based on the determined partition pattern for the depth block without intra-prediction decoding the block of the first size using the determined partition pattern associated with the block of the first size.

2. The method of claim 1, wherein the partition pattern associated with a block of the first size comprises a partition pattern associated with a block of size 16×16, and wherein determining the partition pattern for the depth block of the second size comprises determining the partition pattern for the depth block of size 32×32 based on the determined partition pattern associated with the block of size 16×16.

3. The method of claim 1, further comprising:
   receiving information identifying a sub-block within the depth block, wherein a size of the sub-block is the first size,
   wherein determining the partition pattern associated with block of the first size comprises determining the partition pattern for the sub-block, and
   wherein determining the partition pattern for the depth block of the second size comprises determining the partition pattern for the depth block of the second size based on the determined partition pattern for the sub-block.

4. The method of claim 3, wherein determining the partition pattern for the depth block of the second size based on the determined partition pattern for the sub-block comprises extending a linear line of the partition pattern for the sub-block to boundaries of the depth block, wherein a resulting linear line defines the partition pattern for the depth block.

5. The method of claim 1, wherein the determined partition pattern associated with the block of the first size comprises a line-based partition pattern from a plurality of line-based partition patterns associated with the block of the first size, and wherein the partition pattern for the depth block comprises a line-based partition pattern for the depth block that partitions the depth block into two partitions.

6. The method of claim 1, wherein determining the partition pattern for the depth block of the second size comprises determining the partition pattern for the depth block of the second size without receiving information indicating the partition pattern for the depth block of the second size.

7. A method of encoding video data, the method comprising:

constructing a partition pattern list that includes one or more partition patterns associated with a block of a first size;

determining a partition pattern associated with the block of the first size based on the partition pattern list;

determining a partition pattern for a depth block of a second size based on the determined partition pattern associated with the block of the first size, wherein the second size is larger than the first size, and wherein the depth block is a block of a depth map in a framework of three-dimensional (3D) video coding;

intra-prediction encoding the depth block based on the determined partition pattern for the depth block without intra-prediction encoding the block of the first size using the determined partition pattern associated with the block of the first size; and signaling an index into the constructed partition pattern list that identifies the determined partition pattern associated with the block of the first size, wherein a video decoder uses the index to intra-prediction decode the depth block.

8. The method of claim 7, wherein the partition pattern associated with a block of the first size comprises a partition pattern associated with a block of size 16×16, and wherein determining the partition pattern for the depth block of the second size comprises determining the partition pattern for the depth block of size 32×32 based on the determined partition pattern associated with the block of size 16×16.

9. The method of claim 7,
wherein determining the partition pattern associated with the block of the first size comprises determining the partition pattern associated with the block of the first size from a partition pattern identified in the constructed partition pattern list.

10. The method of claim 7, further comprising:
identifying a sub-block within the depth block, wherein a size of the sub-block is the first size,
wherein determining the partition pattern associated with the block of the first size comprises determining the partition pattern for the identified sub-block, and
wherein determining the partition pattern for the depth block of the second size comprises determining the partition pattern for the depth block of the second size based on the determined partition for the identified sub-block.

11. The method of claim 10, wherein determining the partition pattern for the depth block of the second size based on the determined partition pattern for the identified sub-block comprises extending a linear line of the partition pattern for the identified sub-block to boundaries of the depth block, wherein a resulting linear line defines the partition pattern for the depth block.

12. The method of claim 7, wherein the partition pattern associated with the block of the first size comprises a line-based partition pattern from a plurality of line-based partition patterns associated with the block of the first size, and wherein the partition pattern for the depth block comprises a line-based partition pattern for the depth block that partitions the depth block into two partitions.

13. A device for video coding, the device comprising:
a video data memory that stores one or more partition patterns associated with a block of a first size; and
a video coder comprising one or more processors, the video coder configured to:
construct a partition pattern list that includes the one or more partition patterns associated with the block of the first size;

determine a partition pattern associated with the block of the first size from the stored one or more partition patterns based on the partition pattern list, wherein the partition pattern in the partition pattern list is identified by an index in the partition pattern list;

determine a partition pattern for a depth block of a second size based on the determined partition pattern associated the block of the first size, wherein the second size is larger than the first size, and wherein the depth block is a block of a depth map in a framework of three-dimensional (3D) video coding; and intra-prediction code the depth block based on the determined partition pattern for the depth block without intra-prediction coding the block of the first size using the determined partition pattern associated with the block of the first size.

14. The device of claim 13, wherein the partition pattern associated for a block of the first size comprises a partition pattern associated a block of size 16×16, wherein the depth block of the second size comprises a depth block of size 32×32, and wherein the video coder is configured to determine the partition pattern for the depth block of size 32×32 based on the determined partition pattern associated with the block of size 16×16.

15. The device of claim 13,
wherein the video coder comprises a video decoder,
wherein the video decoder is configured to:
receive the index into the partition pattern list,
wherein, to determine the partition pattern associated with the block of the first size, the video decoder is configured to determine the partition pattern associated with the block of the first size based on the received index into the partition pattern list, and
wherein, to intra-prediction code the depth block, the video decoder is configured to intra-prediction decode the depth block based on the determined partition pattern for the depth block.

16. The device of claim 13,
wherein the video coder comprises a video decoder,
wherein the video decoder is configured to receive information identifying a sub-block within the depth block, wherein a size of the sub-block is the first size,
wherein, to determine the partition pattern associated with the block of the first size, the video decoder is configured to determine the partition pattern for the sub-block, and
wherein, to determine the partition pattern for the depth block of the second size, the video decoder is configured to determine the partition pattern for the depth block of the second size based on the determined partition pattern for the sub-block.

17. The device of claim 13,
wherein the video coder comprises a video decoder,
wherein, to determine the partition pattern for the depth block of the second size, the video decoder is configured to determine the partition pattern for the depth block of the second size without receiving information indicating the partition pattern for the depth block of the second size.

18. The device of claim 13,
wherein the video coder comprises a video encoder,
wherein, to intra-prediction code the depth block, the video encoder is configured to intra-prediction encode the depth block based on the determined partition pattern for the depth block.

19. The device of claim 18, wherein the video encoder is configured to signal the index into the constructed partition pattern list that identifies the determined partition pattern associated with the block of the first size, wherein a video decoder uses the index to intra-prediction decode the depth block.

20. The device of claim 13,
wherein the video coder comprises a video encoder,
wherein the video encoder is configured to identify a sub-block within the depth block, wherein a size of the sub-block is the first size,
wherein, to determine the partition pattern associated with the block of the first size, the video encoder is configured to determine the partition pattern for the identified sub-block, and
wherein, to determine the partition pattern for the depth block of the second size, the video encoder is configured to determine the partition pattern for the depth block of the second size based on the determined partition for the identified sub-block.

21. The device of claim 13, wherein the partition pattern associated with the block of the first size comprises a line-based partition pattern from a plurality of line-based partition patterns associated with the block of the first size, and wherein the partition pattern for the depth block comprises a line-based partition pattern for the depth block that partitions the depth block into two partitions.

22. The device of claim 13, wherein the device comprises at least one of: an integrated circuit (IC), a micro-controller, a wireless device, a desktop computer, a laptop computer, a tablet computer, a set-top box, a telephone handset, a television, a camera, a display device, a digital media player, a video gaming console, or a video streaming device.

23. A non-transitory computer-readable storage medium having instructions stored thereon that when executed by one or more processors of a device for video coding cause the one or more processors to:

construct a partition pattern list that includes one or more partition patterns associated with a block of a first size;
determine a partition pattern associated with the block of the first size based on the partition pattern list, wherein the partition pattern in the partition pattern list is identified by an index in the partition pattern list;
determine a partition pattern for a depth block of a second size based on the determined partition pattern associated with the block of the first size, wherein the second size is larger than the first size, and wherein the depth block is a block of a depth map in a framework of three-dimensional (3D) video coding; and
intra-prediction code the depth block based on the determined partition pattern for the depth block without intra-prediction coding the block of the first size using the determined partition pattern associated with the block of the first size.

24. The non-transitory computer-readable storage medium of claim 23, wherein the partition pattern associated with the block of the first size comprises a partition pattern for a block of size 16×16, and wherein the instructions that cause the one or more processors to determine the partition pattern for the depth block of the second size comprises instructions that cause the one or more processors to determine the partition pattern for the depth block of size 32×32 based on the determined partition pattern for the block of size 16×16.

25. The non-transitory computer-readable storage medium of claim 23, wherein the partition pattern associated the with block of the first size comprises a line-based partition pattern from a plurality of line-based partition patterns associated with the block of the first size, and wherein the partition pattern for the depth block comprises a line-based partition pattern for the depth block that partitions the depth block into two partitions.

* * * * *